(12) United States Patent
Knutsson et al.

(10) Patent No.: US 11,040,282 B2
(45) Date of Patent: Jun. 22, 2021

(54) CONTROLLING A USER INTERFACE OF A COMPUTER DEVICE

(71) Applicant: KING.COM LIMITED, St. Julians (MT)

(72) Inventors: Sebastian Knutsson, Stockholm (SE); Bjorn Ritzl, Stockholm (SE)

(73) Assignee: KING.COM LTD., St. Julians (MT)

( * ) Notice: Subject to any disclaimer, the term of this patent is extended or adjusted under 35 U.S.C. 154(b) by 1339 days.

(21) Appl. No.: 14/863,857

(22) Filed: Sep. 24, 2015

(65) Prior Publication Data

US 2017/0087467 A1    Mar. 30, 2017

(51) Int. Cl.
  *A63F 13/537* (2014.01)
  *A63F 13/35* (2014.01)
  *A63F 13/87* (2014.01)

(52) U.S. Cl.
  CPC .......... *A63F 13/537* (2014.09); *A63F 13/35* (2014.09); *A63F 13/87* (2014.09)

(58) Field of Classification Search
  CPC ......... A63F 13/537; A63F 13/35; A63F 13/97
  See application file for complete search history.

(56) References Cited

U.S. PATENT DOCUMENTS

| | | | | | |
|---|---|---|---|---|---|
| 2,026,082 A | * | 12/1935 | Darrow | ............... | A63F 3/00072 273/256 |
| 5,618,045 A | * | 4/1997 | Kagan | ................... | A63F 13/12 463/40 |
| 5,807,174 A | * | 9/1998 | Fukuhara | ............. | A63F 13/005 463/31 |
| 5,890,906 A | * | 4/1999 | Macri | ................... | A63F 13/285 345/156 |
| 6,287,200 B1 | * | 9/2001 | Sharma | ................... | A63F 13/12 463/40 |
| 6,652,376 B1 | * | 11/2003 | Yoshida | ................. | A63F 13/10 463/6 |
| 6,674,995 B1 | * | 1/2004 | Meyers | ................... | A63F 13/12 455/41.2 |

(Continued)

FOREIGN PATENT DOCUMENTS

| | | |
|---|---|---|
| EP | 2446949 A2 | 5/2012 |
| EP | 2463000 A2 | 6/2012 |

OTHER PUBLICATIONS

"International Search Report, dated Dec. 6, 2016, and Written Opinion issued in International Application No. PCT/EP2016/072851".

*Primary Examiner* — Omkar A Deodhar
*Assistant Examiner* — Matthew D Hoel
(74) *Attorney, Agent, or Firm* — Saul Ewing Arnstein & Lehr LLP

(57) ABSTRACT

A computer system a plurality of user devices, each in communication with the server via a communication network. Each user device user plays a game and uploads game data. The user devices receive event data from the server and display an indicator of an event based on the event data at a navigable image rendered on the display. The event is associated with a location icon rendered on the display at the user device. The event data defines a game mode object accessible by a user at the location icon, the game mode object, when accessed providing a game mode which provides an interaction with other users at the user devices.

21 Claims, 29 Drawing Sheets

(56) References Cited

U.S. PATENT DOCUMENTS

| | | | | |
|---|---|---|---|---|
| 6,884,166 B2* | 4/2005 | Leen | G07F 17/3234 | 463/16 |
| 6,935,945 B2* | 8/2005 | Orak | A63F 13/12 | 463/9 |
| 6,955,541 B2* | 10/2005 | Macri | A63B 71/0622 | 434/247 |
| 6,966,832 B2* | 11/2005 | Leen | G07F 17/3237 | 463/16 |
| 7,452,273 B2* | 11/2008 | Amaitis | A63F 1/06 | 463/22 |
| 8,038,532 B2* | 10/2011 | Neervoort | A63F 13/02 | 463/39 |
| 8,366,546 B1* | 2/2013 | Naik | A63F 13/12 | 463/31 |
| 8,480,494 B2 | 7/2013 | Cantor | | |
| 8,512,149 B2* | 8/2013 | Walker | G07F 17/3227 | 463/16 |
| 8,622,828 B1* | 1/2014 | Harrington | G06Q 50/01 | 463/31 |
| 8,934,995 B2* | 1/2015 | Eisner | G06F 15/17306 | 700/91 |
| 9,283,473 B2* | 3/2016 | Tagawa | A63F 13/06 | |
| 9,533,217 B2* | 1/2017 | Naik | A63F 13/12 | |
| 9,586,139 B2* | 3/2017 | Jabara | H04W 8/186 | |
| 9,662,571 B1* | 5/2017 | Jabara | H04W 8/186 | |
| 9,682,315 B1* | 6/2017 | Miller | A63F 13/12 | |
| 9,757,639 B2* | 9/2017 | Eisner | G06F 15/17306 | |
| 9,855,500 B2* | 1/2018 | Jabara | H04W 8/186 | |
| 10,092,812 B2* | 10/2018 | Eisner | G06F 15/17306 | |
| 10,335,678 B2* | 7/2019 | Takahashi | G06F 3/04842 | |
| 2002/0006825 A1* | 1/2002 | Suzuki | A63F 13/12 | 463/40 |
| 2002/0016196 A1* | 2/2002 | Orak | G06Q 30/0218 | 463/9 |
| 2002/0154155 A1* | 10/2002 | McKirchy | G06F 9/453 | 715/705 |
| 2003/0045359 A1* | 3/2003 | Leen | G07F 17/32 | 463/42 |
| 2003/0109310 A1* | 6/2003 | Heaton | G07F 17/3232 | 463/42 |
| 2003/0130031 A1* | 7/2003 | Yoshida | A63F 13/5375 | 463/23 |
| 2004/0063084 A1* | 4/2004 | Macri | A63F 13/807 | 434/258 |
| 2005/0048453 A1* | 3/2005 | Macri | A63F 13/807 | 434/247 |
| 2005/0181851 A1* | 8/2005 | Amaitis | G07F 17/3276 | 463/12 |
| 2008/0153596 A1* | 6/2008 | Nguyen | A63F 13/12 | 463/42 |
| 2008/0194333 A1* | 8/2008 | Zalewski | A63F 13/12 | 463/42 |
| 2008/0252007 A1* | 10/2008 | Baker | A63F 3/00006 | 273/242 |
| 2011/0077087 A1* | 3/2011 | Walker | G07F 17/3227 | 463/42 |
| 2012/0214562 A1 | 8/2012 | Im et al. | | |
| 2014/0335960 A1 | 11/2014 | Black et al. | | |

* cited by examiner

CONTROLLING A USER INTERFACE OF A COMPUTER DEVICE

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush.

Another known match three-type game is known by the trade name Pet Rescue. Both of these can be played in Saga format.

SUMMARY OF THE INVENTION

Some embodiments may be directed to a Saga format which may seek to address at least one of the above challenges.

According to one aspect, there is provided a computer implemented method of controlling a display at a user interface of a user device having a game mode module available to execute a game, the method comprising when executing the game: executing image generation code to render a navigable image on the display, the navigable image comprising a set of location icons each representing a location associated with at least one game mode object of multiple game mode objects of different types selectable at the location icon; responsive to user selection by a first user at the user interface of one of the game mode objects at a location icon, executing first, second or third computer code corresponding to the type of game mode object selected at that location, wherein executing the first computer code generates a first game mode for user engagement of the first user at the user interface, the first game mode providing user selectable game objects on the display and responding to user engagement with the game objects to generate a first marker when a first game objective is attained; executing the second computer code generates a second game mode for user engagement of the first user at the user interface, the second game mode providing user selectable game objects on the display and responding to user engagement with the game objects to generate a successful task signal when a second game objective is attained, the successful task signal selectively causing an electronic assistance message to be transmitted to provide assistance to another user; and executing the third computer code generates a third game mode in which an initial game board of user selectable objects is generated on the display of the user device, in which the third computer code is configured to receive remote user input game data generated at other user devices by other users who also receive the initial game board at their user devices.

This may also include the step of receiving form a server a social engagement item to display at a location at which another user at another user device connected to the server has attained a game objective.

An acknowledgement may be returned to the other user device on collecting the social engagement item.

This may provide three game modes at each location, which can be played and replayed a certain number of times. Two of the game modes are new: group game mode and social game mode.

The multiple game mode objects may include a game object of a fourth type, wherein executing fourth computer code associated with the game mode object of the fourth type generates a fourth game mode for user engagement of the first user, wherein the fourth game mode is a more challenging version of the first game mode, and wherein an ultimate attainment marker is generated when the game objective of the fourth game mode is attained.

The image generation code may define a pre-set maximum number of location icons, each associatable with the multiple game modes. In this way a fixed number of locations becomes available, which can be played and replayed in multiple game modes.

On at least some user accesses to the game a subset of the pre-set number of location icons may be associated with one or more game object of the multiple game mode objects, and others of the pre-set number of location icons may have no game mode objects associated with them. The user may have to attain a certain number of game objectives in different game modes at some locations to 'unlock' game modes at other locations.

The method may be conducted at a user device in communication with a game server via a communication network, wherein the server may provide the at least one game mode object for each of the subset of location icons when a user accesses the game. In an offline mode, game mode objects may be generated at the user device itself.

For some game modes, the game mode object may be available to a user for a limited time period only, for example in group game mode and social game mode.

When playing the game a user may access one or more game mode objects at a current location represented by a location icon. The method may comprise storing an identifier of the current location associated with a user identifier of the user, whereby when the user next accesses the game, the image generation code may render visible to the user a location icon associated with the last played location of the user.

The method may comprise the step of storing, at the server, contact identifiers of other users with their last played location who are connected with the first user via a social platform, wherein the image generated code may access the contact identifier and their locations to display them in the navigable image.

For a path based Saga format the image generation code may render a visible portion of the navigable image in the form of a path through a landscape, wherein only some of the location icons may be visible to a user when a user accesses a game.

Game mode objects may be at the location on the map, or where the navigable image includes a portion visible to a user when a user accesses a game, separate from the path, locations with selectable game modes available for the user may be presented with an associated location indicator in a selectable manner in the visible portion even if the location icon representing that location on the path is not visible. The visible portion may be a side bar for example. Selection of the location indicator may cause the image to automatically scroll (quick pan') to present the location icon represented by the selected location indicator to be visible to the user, whereby any game modes available at that location icon may be selected by the user.

Selection of a location icon with an available game mode may cause presentation of a lobby area on the display showing the available game mode for selection by a user.

More than one game mode may be presented to a user by presenting swipeable game mode indicators wherein a user may swipe a game mode indicator on the display in the lobby to select the game mode they wish to access.

The method may be such that each of the second and third game modes generate a respective marker when the second or third game objective is attained.

Any generated markers may be associated on the display with the location icon at which the game mode object caused the marker to be generated. Alternatively, they may be indicated on another portion of the display.

According to another aspect, there is provided a computer device comprising: a user interface with a display; a memory holding executable code of a game mode module; and a processor for executing the code, wherein image generation code is configured to render a navigable image on the display, the navigable image comprising a set of location icons each representing a location associated with at least one game mode object of multiple game mode objects of different types selectable at the location icon; the game mode object being responsive to user selection by a first user at the user interface at a location icon, and configured to cause first, second or third computer code corresponding to the type of game mode object selected at that location to be executed wherein executing the first computer code generates a first game mode for user engagement of the first user at the user interface, the first game mode providing user selectable game objects on the display and responding to user engagement with the game objects to generate a first marker when a first game objective is attained; executing the second computer code generates a second game mode for user engagement of the first user at the user interface, the second game mode providing user selectable game objects on the display and responding to user engagement with the game objects to generate a successful task signal when a second game objective is attained, the successful task signal selectively causing an electronic assistance message to be transmitted to provide assistance to another user; and executing the third computer code generates a third game mode in which an initial game board of user selectable objects is generated on the display of the user device, in which the third computer code is configured to receive remote user input game data generated at other user devices by other users who also receive the initial game board at their user devices.

Another aspect provides a product comprising computer code on a computer readable media which provides a game mode module which, when executed: executes image generation code to render a navigable image on the display, the navigable image comprising a set of location icons each representing a location associated with at least one game mode object of multiple game mode objects of different types selectable at the location icon; responsive to user selection by a first user at the user interface of one of the game mode objects at a location icon, executes first, second or third computer code corresponding to the type of game mode object selected at that location, wherein executing the first computer code generates a first game mode for user engagement of the first user at the user interface, the first game mode providing user selectable game objects on the display and responding to user engagement with the game objects to generate a first marker when a first game objective is attained; executes the second computer code to generate a second game mode for user engagement of the first user at the user interface, the second game mode providing user selectable game objects on the display and responding to user engagement with the game objects to generate a successful task signal when a second game objective is attained, the successful task signal selectively causing an electronic assistance message to be transmitted to provide assistance to another user; and executes the third computer code to generate a third game mode in which an initial game board of user selectable objects is generated on the display of the user device, in which the third computer code is configured to receive remote user input game data generated at other user devices by other users who also receive the initial game board at their user devices.

Another aspect may provide a computer implemented method of controlling a display at a user interface of a user device, having a game code module available to execute a game, the method comprising, when executing the game: executing image generation computer code to render a navigable image on the display, the navigable image comprising a plurality of location icons representing respective locations, at least one of which is associated with at least two selectable game mode objects of different types, wherein selection of a first game mode object causes first game computer code to be accessed and executed, and selection of a second game mode object causes second game computer code to be accessed and executed, wherein each of the first and second game computer code provide user selectable game objects on the display, the configuration of game objects presented to a user by the first and second game computer code being different, and respond to user engagement with the game objects to determine when a game objective is attained and to generate a first marker when a game objective is attained in the first game computer code, and a second marker when a second game objective is attained in the second game computer code, the method comprising associating each of the first and second markers with the location icon.

The second game computer code may provide a 'social mode' which responds to user engagement with the game objects to generate a successful task signal when the second game objective is attained, the successful task signal selectively causing an electronic assistance message to be transmitted to provide assistance to another user.

The at least one location icon may be associated with a third game mode object, which causes third game computer code to be accessed and executed, wherein the third game computer code receives user data from other users at other user devices in addition to that of the first user to achieve a cumulative game objective, and wherein a third marker is attained responsive to the cumulative game objective being attained.

The markers may be the same or different for the different types of game mode objects. The difference can be in their visual appearance.

Game modes can be played and replayed at each location. Second and third game modes may be 'unlocked' at a location only after a certain numbers of first markers have been attained.

A maximum number of markers attainable at a location icon may be set, after which no further selectable game mode objects are available at the location represented by that location icon.

The plurality of location icons may be a pre-set maximum number, wherein when each location icon of the pre-set number has a maximum number of markers, a new game mode object is made available to the user defining an end game.

When the locations are visible in some of a path through a landscape, selectable game mode objects are available for selection at location icons regardless of the sequence with which the location icon appears in the path.

In addition or in place of 'unlocking' modes at a particular location, locations themselves can be 'unlocked'. This can be achieved by monitoring attainment of a defined number of first or second markers at a first location of the subset; and responsive to attainment of the defined number of first or second markers at the first location, rendering available a game mode object at another location which is not in the subset.

The markers are associated with the location icon by being rendered visible on a player computer at a location designated by the location icon in a portion of the display separate from the location designated by the location icon.

Another aspect provides a computer implemented method of controlling a display at a user interface of a user device, having a game code module available to execute a game, the method comprising: executing computer code of the game code module to generate a group game mode for user engagement at the user interface, the group game mode providing user selectable game objects on an initial game board on the display, and responding to user engagement with the game objects to cause game changes on the game board and to generate game data arising from those game changes, the computer code further configured to receive remote user game data generated by other users engaged in the group game mode at their user devices who also receive the initial game board at their user devices, wherein the computer code is configured to generate on the display: (i) ongoing game changes in the game board resulting from activity of the user in engaging with game objects of the game board; and (ii) a progress indicator which indicates cumulative progress of the user and other users, using the game data generated by the user and the remote user input game data.

The progress indicator may be in the form of a bar, wherein a shaded proportion of the bar denotes progress, and wherein a length of the bar denotes a maximum score representing a cumulative game objective.

When conducted at a user device in communication with a game server via a communication network, the method may comprise a step of storing, at the server, contact identifiers of other users connected with the first user via a social platform.

Event data defining the game mode may be received from the server, the event data identifying contacts of the user who will constitute the other users participating in the group game mode.

The contact identifiers may be selected by the user, or selected at the server, for example at random or by geographical location.

The event data may comprise a set of contact identifiers in a format selectable by a user at the user interface, whereby the user can select a subset of the contact identifiers for constituting the other users.

The progress indicator may indicate cumulative progress towards a cumulative objective, wherein users whose user game data contributes towards the cumulative objective may each achieve a marker when the cumulative game objective is attained. Alternatively, all users achieve a marker when the final game objective is attained, whether or not that user made a contribution to the cumulative objective.

The markers may be displayed at a location icon at which the game mode was accessed, the location icon representing a location on a path of an image generated on the user interface.

The group game modes may be rendered available for user engagement for a limited period of time (e.g. one to five days), after which time further progress of the user or the other users no longer contributes towards the cumulative game objective.

The time period for engaging the group game mode may be set at the server.

The game can display on the display an indicator of the time remaining for engagement in the game mode.

If the cumulative game objective is attained in the period of time, further play contributes to an overall attainment score.

To engage and reward players, their respective contributions of the users may be monitored, wherein a recognition notification is issued identifying a user whose game data represented the greatest contribution.

Respective further play contributions of the players may be monitored wherein a recognition notification is issued identifying a user whose further play represented the greatest contribution to the overall achievement score.

Genuine data may be generalised by each user in one or more players of a server level at the location, each play having an end score which contributed the same data.

Another aspect provides a computer device comprising: a user interface with a display; a memory holding executable code of a game mode module; a processor configured to execute the code of the game code module to generate a group game mode for user engagement at the user interface, the group game mode providing user selectable game objects on an initial game board on the display, and responding to user engagement with the game objects to cause game changes on the game board and to generate game data arising from those game changes, the computer code further configured to receive from a server in communication with the user device remote user game data generated by other user devices of users engaged in the group game mode who also receive the initial game board at their user devices, wherein the computer code is configured to generate on the display: (i) ongoing game changes in the game board resulting from activity of the user in engaging with game objects of the game board; and (ii) a progress indicator which indicates cumulative progress of the user and other users, using the game data generated by the user device and the remote user game data.

Another aspect provides a computer program product comprising computer code on a computer readable media which provides a game mode module which, when executed: executes computer code of the game code module to generate a group game mode for user engagement at the user interface, the group game mode providing user selectable game objects on an initial game board on the display, and responsive to user engagement with the game objects causes game changes on the game board and generates game data arising from those game changes, the computer code further configured to receive remote user game data generated by other users engaged in the group game mode at their user devices who also receive the initial game board at their user devices, wherein the computer code is configured to generate on the display: (i) ongoing game changes in the game board resulting from activity of the user in engaging with game objects of the game board; and (ii) a progress indicator which indicates cumulative progress of the user and other users, using the game data generated by the user and the remote user input game data.

Another aspect provides a computer system comprising: a game server which holds executable game modules; a store accessible by the game server holding user data; and a plurality of user devices, each in communication with the server via a communication network, wherein each of the user devices is arranged to download and execute one or more of the computer game modules which provides at the user device user selectable game objects on a display at the user device, and responds to user engagement with the game objects to assess whether a game objective is attained, and to upload to the game server game data based on the user engagement with the game code module, wherein the user device is further configured to receive event data from the game server and to show an indicator of an event based on the event data at a navigable image rendered on the display, the event being associated with a location icon rendered on the display at the user device, wherein the event data defines a game mode object accessible by a user at the location icon, the game mode object, when accessed providing a game mode which provides an interaction with other users at the user devices.

The computer game module comprise image generation code which generates the navigable image on the display.

The navigable image may comprises multiple location icons, each representing a location, wherein the event data defines one or more game mode objects for display at one or more locations in the navigable image.

The event data may define the social game mode in which response to user engagement of the user with the game objects generates an electronic assistance message addressed which identifies a user at another of the user devices to receive help when a social game objective is attained.

The event data may define the group game mode in which an initial game board of user selectable objects is generated on the display of each user device of a group of user devices, wherein the game mode is configured to receive game data generated by other users at the other user devices who also receive the initial game board.

Each user device may comprise a local store which holds user data relating to contacts of the user.

The user data held in the store may comprise aggregated data relating to contacts' last played location and/or last time of engagement with the game.

The local store may hold user data defining the last location of the playing user at the user device where the user was engaged when he logged out of the game.

For enabling an offline mode of play the user device may comprise an event data generator operable to generate event data to define a game mode object for display on that user device.

The event data generator may configured to access the local store for determining when to generate event data.

In the social mode, an identifier of the user for whom the electronic assistance message is to provide assistance is comprised in event data and displayed at the location icon.

The event data may define the identifier of a contact to whom the electronic assistance message is to be addressed.

The event data may define an identifier of a contact who has issued a real request for help and to whom the electronic assistance message is to be addressed, wherein the game server is configured to receive the electronic assistance message and generate help to that requesting contact.

The event data may define an identifier for displaying in the social game object, when no contact has issued a request for help, wherein the game server is configured to ignore the electronic assistance message.

Each user device may be configured to receive user data in the local store from the server to enable offline operation when the user device is not in communication with the server.

Another aspect provides a computer implemented method of controlling a display to user interface of a user device, the method comprising at the user device: executing image computer code to render a navigable image on the display, the navigable image comprising a plurality of location icons, each associated with at least one game mode object of multiple game mode objects of different types; receiving from a game server event data which defines game modes and responsive to receiving the event data showing on the display an indicator of the selectable game mode object corresponding to each game mode in association with the location at which the game mode object is available, wherein each game mode defined by the event data provides an interaction between the user of the user device and other users of other users devices which are interacting with the game server.

Another aspect provides a computer implemented method of controlling a display at a user interface of a user device, having a game code module available to execute a game and having a network interface for connection to a game server via a communication network, the method comprising when executing the game: executing image generation code to render a navigable image on the display, the navigable image comprising a plurality of location icons, at least one of which is associated with a selectable game mode object which presents an identifier of an entity seeking assistance; responsive to user selection of the game mode object, executing computer code to generate a game mode for user engagement at the user interface by a first user, the game mode providing user selectable game objects on a game board and an identifier of an entity on the display and responding to user engagement with the game objects to generate a successful task signal when a game objective is attained; wherein the identifier of the entity is provided by the game server when the network interface is connected to the game server and by the game code module at the user device when the user device is offline; and responsive to the successful task signal selectively transmitting an electronic assistance message from the user device to the server based on whether the entity identifier is provided by the server or the game code module, wherein the electronic assistance message is not transmitted when the entity identifier is provided by the game code module on the user device.

The electronic assistance message may be transmitted to the server.

When the entity is a contact who has issued a real request for help, receiving an acknowledgement message may be received from the entity responsive to receipt of the electronic assistance message.

The identity of the entity may be generated by the game code module at the user device based on contact identifiers of the user stored at the user device, wherein the entity has not issued a request for help. This can enable offline mode.

In social mode, the identifier of an entity who is a contact of the user is received from the server, wherein that contact may have made a real request for help or not.

Game mode objects which can be actuated to generate the game mode are provided by game code module at the user device, to enable offline mode. In online mode, game mode objects which can be actuated to generate the game mode are received at the user device from the server via the communication network.

An indicator of the number of acknowledgements received at the user device from the users who received help can be displayed at the user device. An electronic assistance message may be generated for each of multiple selected users to be helped.

The method may, comprise the step of monitoring time lapsed since a last user access to a game in which the game mode is playable, and generating a game mode object with an entity identifier in dependence on the time lapsed.

Another aspect provides a computer device comprising: a memory holding executable code of a game mode module a user interface with a display; and a processor being configured to execute the code, said processor being configured to: execute image generation computer code to render a navigable image on the display, the navigable image comprising a plurality of location icons representing respective locations, at least one of which is associated with at least two selectable game mode objects of different types, wherein selection of a first game mode object causes first game computer code to be accessed and executed, and selection of a second game mode object causes second game computer code to be accessed and executed, wherein each of the first and second game computer code provide user selectable game objects on the display, the configuration of game objects presented to a user by the first and second game computer code being different, and respond to user engagement with the game objects to determine when a game objective is attained and to generate a first marker when a game objective is attained in the first game computer code, and a second marker when a second game objective is attained in the second game computer code, the first and second markers being associated with the location icon.

Another aspect provides a computer program comprising computer code on a computer readable media which provides a game mode module which, when executed, executes image generation computer code to render a navigable image on the display, the navigable image comprising a plurality of location icons representing respective locations, at least one of which is associated with at least two selectable game mode objects of different types, wherein selection of a first game mode object causes first game computer code to be accessed and executed, and selection of a second game mode object causes second game computer code to be accessed and executed, wherein each of the first and second game computer code provide user selectable game objects on the display, the configuration of game objects presented to a user by the first and second game computer code being different, and responsive to user engagement with the game objects determines when a game objective is attained and generates a first marker when a game objective is attained in the first game computer code, and a second marker when a second game objective is attained in the second game computer code, the method comprising associating each of the first and second markers with the location icon.

BRIEF DESCRIPTION OF FIGURES

For a better understanding of some embodiments and to show how the same may be carried into effect reference will now be made by way of example only to the accompanying drawings in which.

DETAILED DESCRIPTION OF EMBODIMENTS

In the new game format described herein, a viewable map is rendered on a user device on which it is possible to see a pre-set and fixed number of levels (or locations). The pre-set or fixed number of locations can be the maximum number of locations with which a player can engage. Each location is associated with a particular game board having particular game objectives which are rendered for a user on the display of his terminal when he selects a location icon associated with a particular location. The fixed number of locations may be 100. In many display scenarios, it may not be possible to show all locations on the display at once, and therefore both fast panning and scrolling options are provided. At present, in a known Saga format, for example, described in our patent application number: Ser. No. 14/029,404 there is the concept of levels, wherein a player proceeds through the levels in sequence. A player must complete the game objective presented to him at each level before he can pass to the next level. At each level, he plays the game by himself (so-called solo play). Continued engagement in the game is accomplished by providing more new levels as users require them. When continuously adding new levels, it can be a problem to enable the user to play a level of his choice as he has to scroll through 1000+ levels in some games. In Saga format games, a player's 'friends' can be rendered visible on the map at their last played level. The more levels which are added the less likely players are to see their 'friends' who are playing the same game as they are spread out over an ever-growing number of levels. On a small screen device this particularly becomes a problem as only a limited number of levels can be displayed. A technical problem which arises is how to enable a user to more easily see his friends' progress on a small screen device when they are at different stages of a game.

Some embodiments introduce a concept of 'location' rather than a 'level'. Each location offers multiple different kinds of play. Each location can be replayed in multiple different game modes. Moreover, each type of game mode can be repeated at the location. The objective of a single user is not necessarily just to pass one level and proceed to the next level, but instead is to complete tasks to fill up a player counter associated with each location. Player counters can be filled up by receiving a marker each time a game objective is achieved for a particular game mode at a particular level. Game modes include solo play, social, group and ultimate. Each of these game modes will be described in more detail in the following.

The terms "user" and "player" are used interchangeably throughout to denote a person engaging with the game. The term "friend" or "contact" is used to denote another player/user who is in a contact graph with the present player/user on a social platform.

Figure 1:
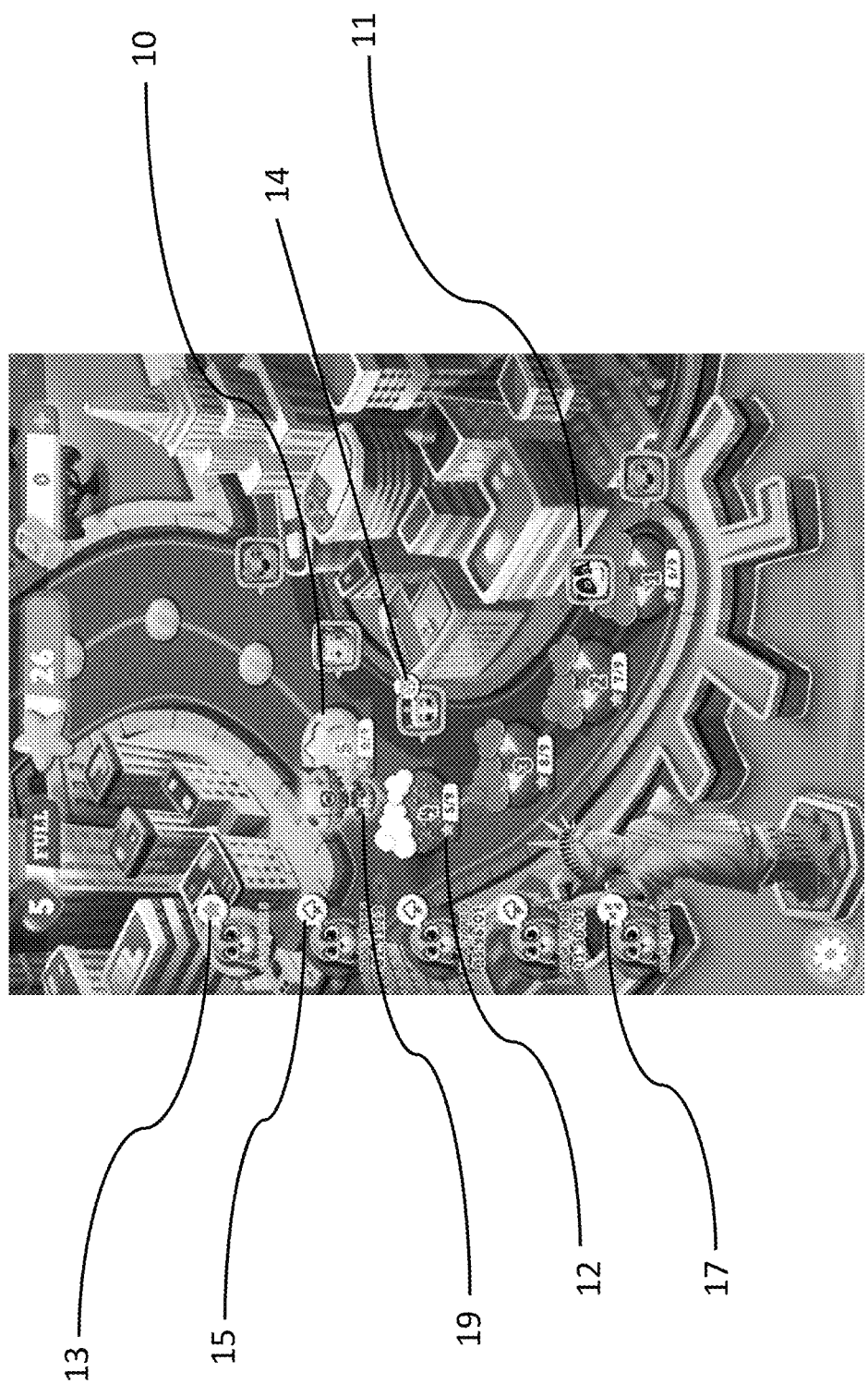
FIG. 1 illustrates a display showing a path of location icons, representing locations.

FIG. 1 illustrates a map which is rendered on the display of a user terminal to a particular player. The map shows different locations, each of which has associated with it a location icon. In the map of FIG. 1, a marker indicator 12 is shown associated with each location icon 10 in the form of a particular number. It will readily be appreciated that as there is not necessarily a sequential focus of play, numbers usually used in a Saga format can be replaced by names or graphical icons or any other distinguishing features. The map shows location icons from locations New York 1 to New York 5. The player marker indicators 12 provide a count of star-shaped markers. These are denoted by reference numeral 12. Each star-shaped marker denotes the fact that the user has achieved a particular game objective in a particular game mode at that location. At location New York 4, a player icon 19 is shown. When a user starts the game, this icon is shown at the last level that a user has played before he logged out of the previous game session. Some location icons are greyed out—no play is currently available at these locations. In play, the icon is shown at the last location the user was about to start, thereby indicating the location last attempted. This is the case until a location is 'unlocked' as described later. The concept of 'unlocking also applies to the availability of game modes at a particular location.

There is a fixed number of markers available at each location icon. Once a player counter has attracted all of its markers, then that location is completely fulfilled. In order to fulfil a location the game can be configured so that game objectives must be achieved at least once in each of four game modes:

Solo (or Regular)
Social
Group
Ultimate (or Boss)

In the regular mode, play is for stars as in the normal saga format. It is sometimes referred to herein as star mode.

The game could be configured so that two or three game modes could have their objectives achieved to fulfil a location.

Figure 2:
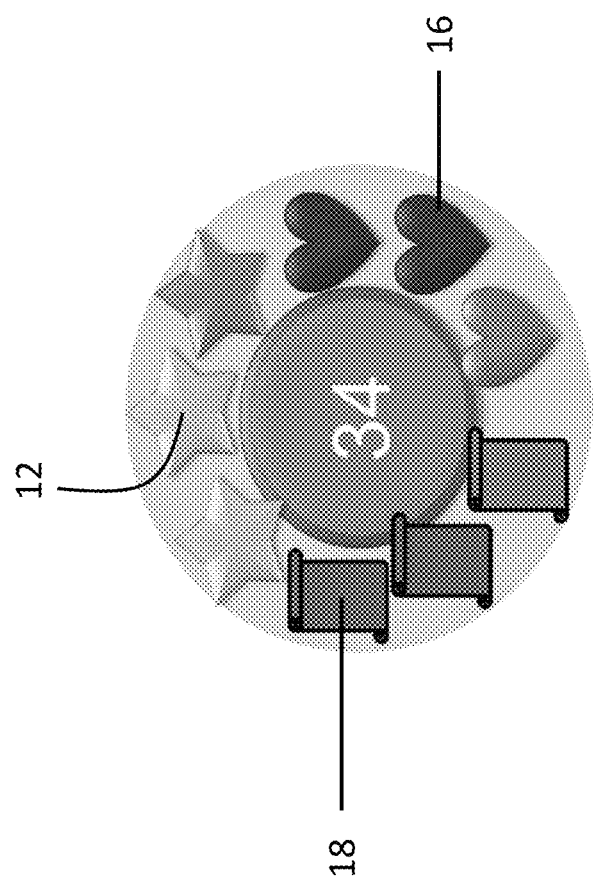
FIG. 2 shows an embodiment of a player counter fulfilled with markers.

FIG. 2 shows an example of a marker indicator in a different embodiment, in the form of a player counter at location No. 34. This player counter has been fulfilled and comprises three star-shaped markers 12, three heart-shaped markers (indicating social quests) 16, and three scroll markers 18 (indicating group quests). While usually different markers are shown denoting different game modes, it will be appreciated that the same marker could be used for all game modes.

Each game level can be played in each of the game modes.

In the star mode (solo play), the aim is to complete the game objective for the location and to score targets to achieve markers. In one embodiment, it is necessary to achieve a minimum number of markers, for example, two, before further events will be generated on the map at that location. Events are invitations to social mode play, group mode play, or ultimate mode play. In the following described embodiment events are generated by a local user device. However, in other embodiment, events could be generated by a game server, for example, when played in a web-based architecture. An event is indicated on a player map by a game mode object or an event icon associated with a location. In some embodiments, events are only generated at some locations after a certain number of other locations have been completely fulfilled or at least partially fulfilled (e.g. three markers) in solo play. Solo play markers at a particular location can be achieved by levels of varying difficulty at that location. Events are sometimes referred to herein as 'quests' or 'tasks', In the social mode (described more fully later in FIG. 8), the player receives a task to help a "friend" (that is another user playing the game who is a friend or contact on a social platform with the present player) to complete their target. This task has been prompted by the client monitoring aggregate data accessed by the client, which is used to generate an event generated identifying the "friend". If the current player achieves their task objective, they gain a social marker 16. In the social mode, if the task is achieved by the present player a successful task signal is generated which can cause an electronic assistance message 800 (FIG. 8) to be transmitted to cause 'help' e.g. a gift (802) to be despatched to the player who has been helped. This causes assistance to be provided to that other player, for example, extra moves or boosters.

In the group mode (described more fully in FIG. 10), a collaborative quest can be undertaken. In group mode, a group of a certain number of players receive a goal to achieve together over a set time period. The group could comprise, for example, 10 to 20 players but in fact, any number of players is possible. Players for a group quest are selected by the game server. They may be selected from a contact graph for a player, or randomly from any players, perhaps in a common geographical location. The set time period may be one to five days, but any specified time is possible. The goal is achieved collaboratively, and if it is achieved within the set time period, all contributors receive a marker indicating that the objective has been attained in group mode. In one embodiment, the largest contributor or contributors to achieving the goal may receive an additional prize. This could be an in-game currency or item. Further play is possible after the objective has been attained if time remains within the set time period. The highest score of a player in this stage may also receive a prize. In another embodiment, the player or players that are the largest contributor or contributors to the total when the end of set time period is reached may receive a prize. It will be appreciated, that once the goal is achieved collaboratively, this allows for people to overachieve and continue to compete for the prizes. In other embodiments, the player or players with the top score of the group may be awarded a prize regardless if the collaborative goal is achieved or not.

In the ultimate mode, a single level objective is provided in a challenging level of the game, to be played as a solo player. The ultimate mode will not be unlocked for a particular location until a pre-set number of markers have been attained for that location. In a situation where, for example, a maximum number of markers is ten, then the ultimate mode would be unlocked after nine markers.

Each time a user returns to log-in to play the game, the map is rendered to him indicating his current state of markers at each location, and also indicating a set of events that he may wish to partake in, in addition to his progression through the locations.

Events are generated by a game server or by the local device in a manner to be described in more detail later. The generation of events is based on the individual position of a particular player, for example:
What markers do they still need to achieve and at what locations?
What other players are missing a marker at the same location and could perhaps join in a group quest?
Which players are active?
Does the player have current contacts, or should an automatic matching algorithm be utilised?
In the latter case, this is for selecting friends or contacts for a social quest.

Game data for each player is held in a game data store 310 (FIG. 3), to be described later.

For most display environments, it will not be possible to fit the map onto a single screen. However, because the map only includes a finite number of locations, all locations can be viewed easily (for example, by scrolling).

When a player logs-in to the game, the game receives updates to show on the map what has happened since the last time a player logged in, including for example one or more of:
Friends/players that have progressed
New joiners known to the player (from a contacts graph)
New events that have started
Events that are about to close (time-based group/social quests)
Friends that have reached an endgame.

In this context, an endgame is unlocked when all markers at all locations have been attained by a single player. The new format described herein achieves a number of objectives which assist to retain and engage players. Players will always see their friends and their progress, as well as their own path towards an endgame when they log-in and view the map. The map provides a possibility to be a true social map which drives events and player interaction. The format solves the technical problem of providing a game which is engaging on an ongoing basis without the need for development teams to continually produce new episodes to constitute ever increasing numbers of new levels. This content production grind of new episodes is replaced herein with dynamic events, which can be generated by more simple algorithmic procedures. Nevertheless, the format presents some technical challenges to implement in its requirement to provide social and group modes. Technical challenges are particularly evident when enabling these modes whether a player is on or offline.

As explained above, each location may be completed in more than one game mode. The modes which had been mentioned are solo or regular mode, social mode, group mode and ultimate or boss mode. These modes may have the same game mechanics, or they may have a different game mechanic. In the present example, game modes are adapted based on the game currently available under the name Pet Rescue. It will also be appreciated that the normal concept of a saga format is retained, in that at different locations, the difficulty level of the game mode may alter.

Using the example of Pet Rescue, in solo mode the requirement is to save enough pets to complete the level. In the lower levels, the game could be offered to a user as a single screen. In later (more challenging) levels, they could be staggered multiscreen.

In a social mode, the game mechanic could be similar to that in Pet Rescue.

The aim may be any suitable aim. By way of example only, the aim may be to save a given number of pets, remove sets of blocks or game objects in a particular order, achieve a certain number of points, remove at least a given number of sets of blocks, optionally in a particular colour order or any other aim.

In some embodiments, a set of game objects or "combo" may be selected and removed. A "combo" or set of game objects or blocks may have a matching characteristic, for example colour. A combo is formed when blocks having the same matching characteristics are located touching one another. Generally, the touching sides must be fully adjacent, but the combo could extend to diagonally locate contiguous blocks in alternative embodiments.

If the aim is satisfied, then an electronic assistance message 804 is formulated addressed to a friend or contact who was identified in the quest. When a player is invited to a social event, the identity of that friend or contact can be displayed at the location where the social mode is to be played. A social quest can be initiated by the client (local device), who identifies a friend from aggregate data received from the server who may actually need help. A social invitation icon 14 indicates that a social quest is available at that location. A social quest asks the player to play a game level in order to assist another player (at a remote user terminal) connected to a common game server. The social invitation icon 14 may show a particular player's name (or image) or it may just indicate that there is a social quest available.

An electronic assistance message may be translated at the receiving end (server) into assistance for the friend, for example to provide them with one or more boosters or one or more additional moves. In some embodiments, this is limited to providing boosters on the level the user required assistance.

In group mode, certain pet types need to be collected for a high number. Users may be awarded an escalating bonus to their score for each consecutive day they play the group quest (for example in a multiday quest, on day 2 an extra bonus pet rescued (+1) is added to a player score in addition to the achieved number, on day 3 the player gets two additional bonus pets added to his score and so on. The game objectives for different markers in a group mode may be different. In some embodiments each marker at a location may be associated with a different game board. Each such game boards may be associated with game objectives that are associated with levels of varying difficulty.

Figure 3:
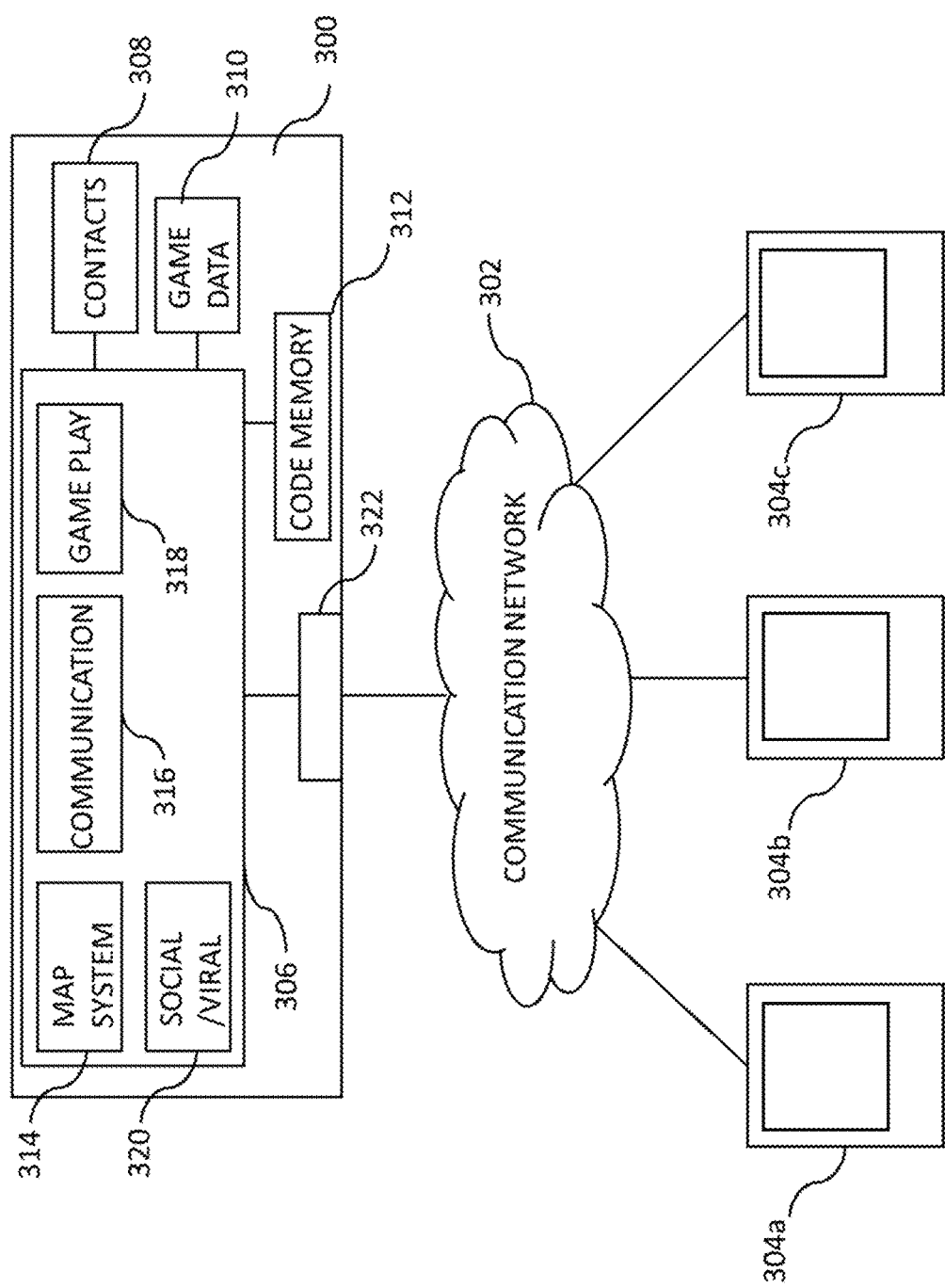
FIG. 3 is a schematic block diagram of a system architecture.

FIG. 3 is a schematic diagram of a computer system for implementing some embodiments of the present invention. The system comprises a game server 300 which communicates via a communication network 302 (such as the internet) with a plurality of user devices 304a, 304b, 304c etc. It will readily be appreciated that in a real environment there could be a very high number of user devices in communication with the game server at any one time. Each user device is associated with a particular user or player. The server has a processor 306 which can be implemented by one or more processing units. Furthermore, the functionality to be explained with respect to the processor 306 in the game server 300 could in reality be carried out in a distributed fashion amongst multiple servers, or even between the local user devices and the server. The present description is for ease of reference only in describing the functionality, and assumes that the game is implemented at the server, e.g. in a web-based architecture. When the game is implemented at a local device, the modules are provided at the local device. The server 300 also comprises electronic storage in the form of computer memory. Two particular types of data are shown stored in separate computer memories—a contact memory 308 and a game data memory 310. However it will be readily appreciated that these could be in the same or different memories, or indeed located at memories remote from the server and accessible thereto.

When implemented at the server, the processor 306 in combination with the memories 308, 310 implement the modules which are shown in the processor. These modules are implemented by computer code sequences which are executed by the processor. These code sequences can be stored in a code memory 312 at the server or in any suitable place. When implemented at a local device, the modules are provided by a client which provides code sequences stored in a local memory. In that case, the server provides event data for events generated locally as described later. The map system module 314 is responsible for the following functions (see FIG. 4A):

Level path 400
Dynamic events 402
What's new animations 404
Endgame view 406
Tell friends about progress 408
Service layer 410
Customer relationship management 412
Kingdom view 414

Each of these will be described in more detail later.

A communication module 316 provides the following functions:

Who's online?
Avatar system

The gameplay module 318 provides the following functions (FIG. 4B):

Star mode 515
Social play 416
Group quest play (in multiple formats) 418
Ultimate play 420
Matching system 422

The Matching system 242 assigns a player to a group for engaging in a group quest, as described later.

'Play' is provided by providing executable computer code to the user device, with a game mode object for display on the map which renders the computer code accessible to a player when he selects the game mode object on the map.

Match making in group mode takes place on the game server 300. The user device (the installed client) asks the server to join a group quest on a specific level and for a specific marker. The server puts the player in a queue for, and assigns the player to, a group.

For social quests it is the user device which finds a suitable friend to help. In one embodiment a list of all friends that have played and failed at least once on a level are aggregated by the server and sent to the user device. The device picks a friend randomly from that list. It would be possible to add more logic to the choice, for instance by giving players with many attempts higher priority, or always helping the friend with most failed attempts.

The social/viral module 320 provides the following functions (see FIG. 4C):

Social quest flow 424
Group quest flow 426
Invites 432. The invites 432 are to invite the friends of the user to play the game In addition to the above functions, the server provides the normal function of a game server. That is, it has a network interface 322 which communicates with the communication networks 302 and via which a game executable can be downloaded to the user devices 304. A user may download a game executable at the time that he logs on, or at subsequent log-in occasions. He may download a game executable once, and then receive updates at subsequent log-ins. The executable will contain information for rendering a map for that user, and game logic for allowing the user to play the game on or off-line. In addition, the data for game mode objects representing events (such as group quests) may be provided by the server to the user, based on algorithmic selection at the server. For mobile devices, a game executable contains all the modules for playing the game offline, requiring access to the server only for event data. Unlike in a known saga format, the map system 314 is responsible for generating for each user a full map showing all locations for that user that a user can scroll through. A user can scroll through the map in on-line or off-line play. That is, the map system module 314 understands for each user their own level path and is able to cause marker scores to be rendered for that particular user, each player counter illustrating the number of markers acquired by that user for that location (e.g. 8/9 at New York 3). The map system module 314 is also capable of causing dynamic events 402 to be rendered. These dynamic events depend on game data received from the user devices, and to achieve this the map system module 314 interacts with the gameplay module 318 as will become clearer later. The map system module 314 is also responsible for generating new animations 404—these are animated icons which are rendered to a user on his display illustrating what has happened since the last time the user logged in. The map system module 314 is also responsible for rendering an endgame view, when all markers have been achieved at all levels The map system module 314 is also responsible for advising friends about user progress 408. This is a two way function. Firstly, it advises a particular user about the progress of the user's friends by showing the location of their most recent achievements. (see the Panda 11 at New York 2) In this way, the achievements of active friends are highlighted. In addition, it provides to the friends of that user information about the current user's progress, similarly showing it on an animated map of those friends. To achieve this it requires access to the contact memory 308 which holds contacts for each particular user. The client can download data from the server. The client keeps a list of the logged in user's friends. The list entries contain information such as user id, name, e-mail, avatar (where available) etc. In addition a list of the aggregated progression of all friends is kept. Aggregated progression is a summary of the number of markers each player has, which location was played last, which location was failed last and how many attempts the player has on that location.

This information is then used to:
 show a player's friends on the map (using last played location)
 decide which friend to help in social quests (e.g. all friends that have played and failed at least once)
 show a toplist sorted by total number of markers (i.e. progress towards end-game)

The map system module 314 also provides a service layer function, a customer relationship management function and a kingdom view.

The communication module 316 provides functionality allowing communication between users. It is responsible for providing to a particular user information about other users who are currently online. In order to do this it requires access to the contact database 308 to understand which contacts for the particular user are also online. The contacts database 308 stores presence data which is used for this purpose. The communication module 316 also provides an avatar system.

The gameplay module 318 runs the game logic necessary to provide the four game modes to be played at each location. It provides the solo play mode, social play mode, group play mode (in three formats) and the ultimate play mode.

Figure 4A:
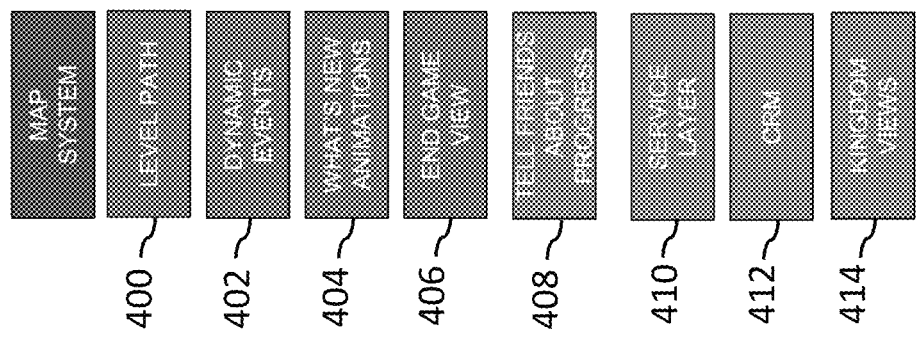
FIG. 4a is a module diagram showing modules of the map system.
Figure 4B:
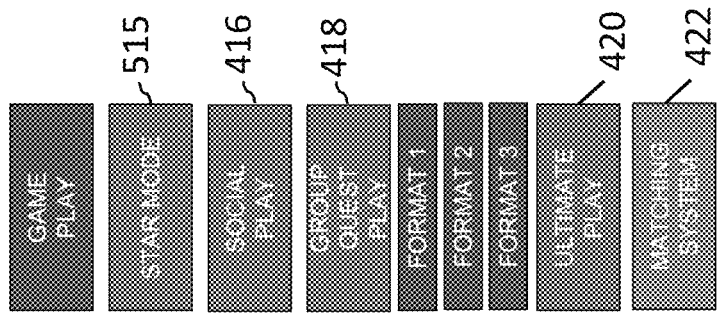
FIG. 4b is a module diagram showing modules of the game play system.
Figure 4C:
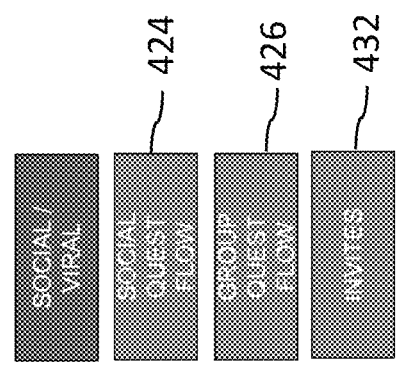
FIG. 4c is a block diagram showing modules of the social/viral component of the system.

The social/viral module 320 provide the social quest flow, group quests flow, and invites. FIGS. 4A, 4B and 4C show respectively schematic block diagrams illustrating these functions in each of the map system modules, gameplay modules and social/viral modules.

The map system 314 will now be described in more detail. As players do not always play the level sequentially, they are guided to points of interest with animations instead. Each time a player returns, the map can pan and highlight who is in the best position towards an end game, and also what has happened since the user last played (see steps S504 to S509 in FIG. 5). New events and timers on the events are clearly presented to allow players to know what is most important to start with.

Icons are rendered on the map to illustrate activity at locations. An icon will show how far a player has progressed at each location by illustrating the number of markers that have been attained at that location. In one embodiment (FIG. 2) a player counter is a flat circle with nine clear pieces and a central part for showing the ultimate mode. Timed events (group quest) and social quests are specifically identified by appropriate icons (e.g. at 14) at the location itself, and/or in a side bar. The solo mode icon 13, group mode icon 15 and social mode icon 17 in FIG. 1. Game levels can be unlocked according to the following unlock rule system.

If a level is completed at a location in solo mode, the achievement of at least one marker will unlock a level at the next location.

In solo mode, some targets can be set to get one to three markers. If a player scores well on the level in solo mode, 1 2 or 3 markers may be achieved depending on the score. When two or more markers are attained this can put the location into rotation for selection to despatch event data defining a social or group mode. This does not mean the game automatically generates an event for a social or group quest at that location, but the location is available for use by the game logic executed at the server for an auto-generated event.

Figure 5:
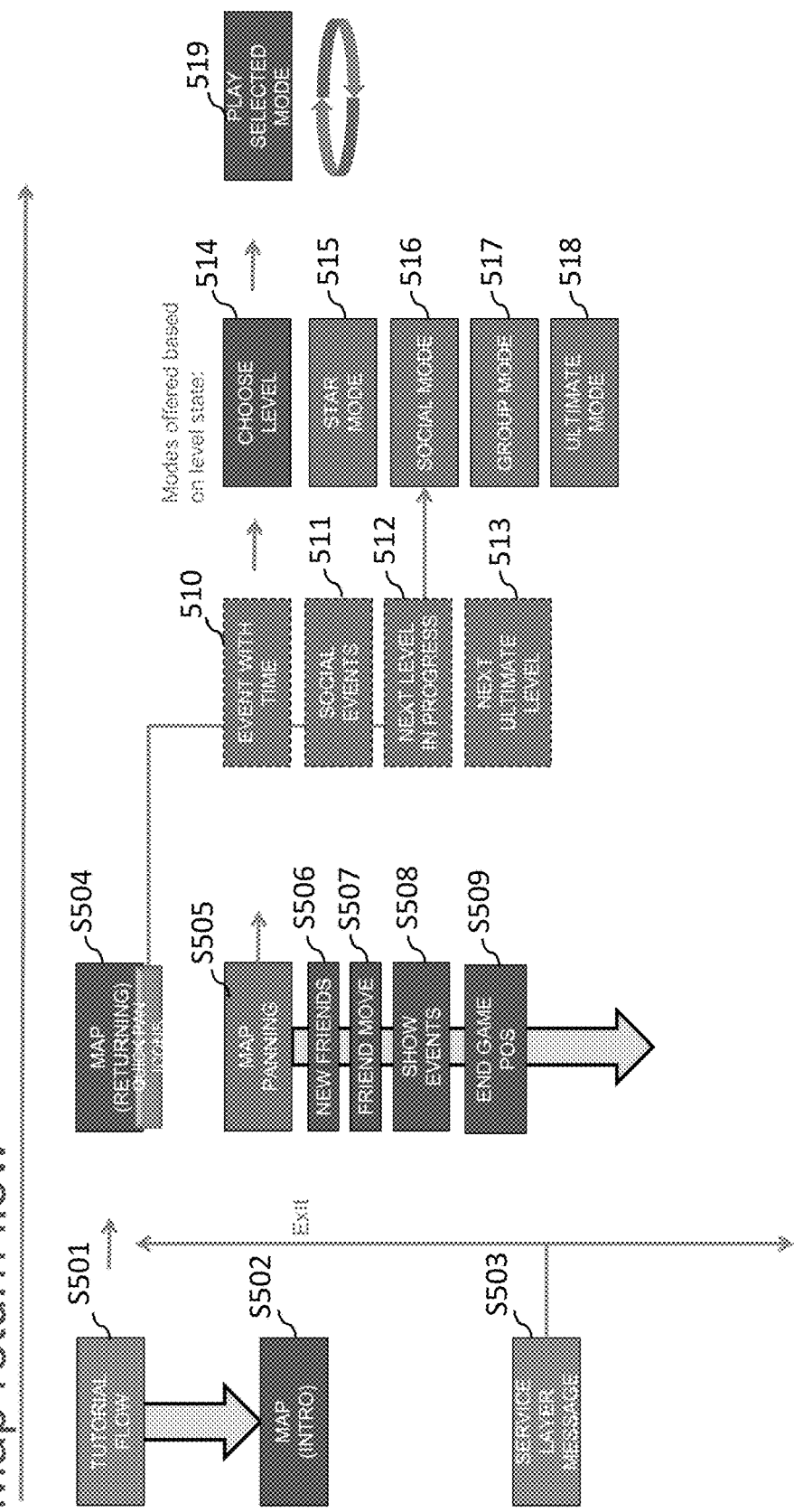
FIG. 5 is a schematic diagram showing map return flow.

FIG. 5 is a schematic flowchart showing the map return flow of the map system module 314. At step S501 a new player receives a tutorial flow, with direct gameplay. This offers (step S502) a map intro. Alternatively, returning players are eligible for a service layer message if the tutorial had already been completed, shown at S503. A map returning step S504 shows a quick pan which sends a user directly to the right game mode for a particular location by displaying icons 13, 15, 17 as quick pan icons panning to the location of a quest and entering the mode of the location. A map panning option S505 shows new friends S506, new friends moves S507, show events S508 and an endgame position (if relevant) S509. First, the map starts with the recap of new friends joining, friends moving ahead of a particular player, a highlight of an ongoing events, illustration of endgame leaders. After an initial pan, the map will "stop" at a location based on certain priorities. In this case, the "stopping" of the map means that after the map has been panned over the screen of the user device, it stops with an image showing one particular portion of the player path, with a particular subset of game locations. This could include a game location (all levels) with events showing where there is some time limitation (for example group quest), where there are social events occurring 511, where the next location is in progress 512, or the next ultimate mode available. Based on the image of the map which the user has, the user chooses a location S514 and the four game modes 515, 516, 517, 518, available at that location are offered after the user chooses the location. The user choice is sent from the user device to the game server where the game mode which is offered to the user depends on the state of the location. For example, the location could be offered one or more of a solo mode, social mode, group mode or ultimate mode depending on what events are available at that location. At step S519 the user plays a selected mode.

Figure 6:
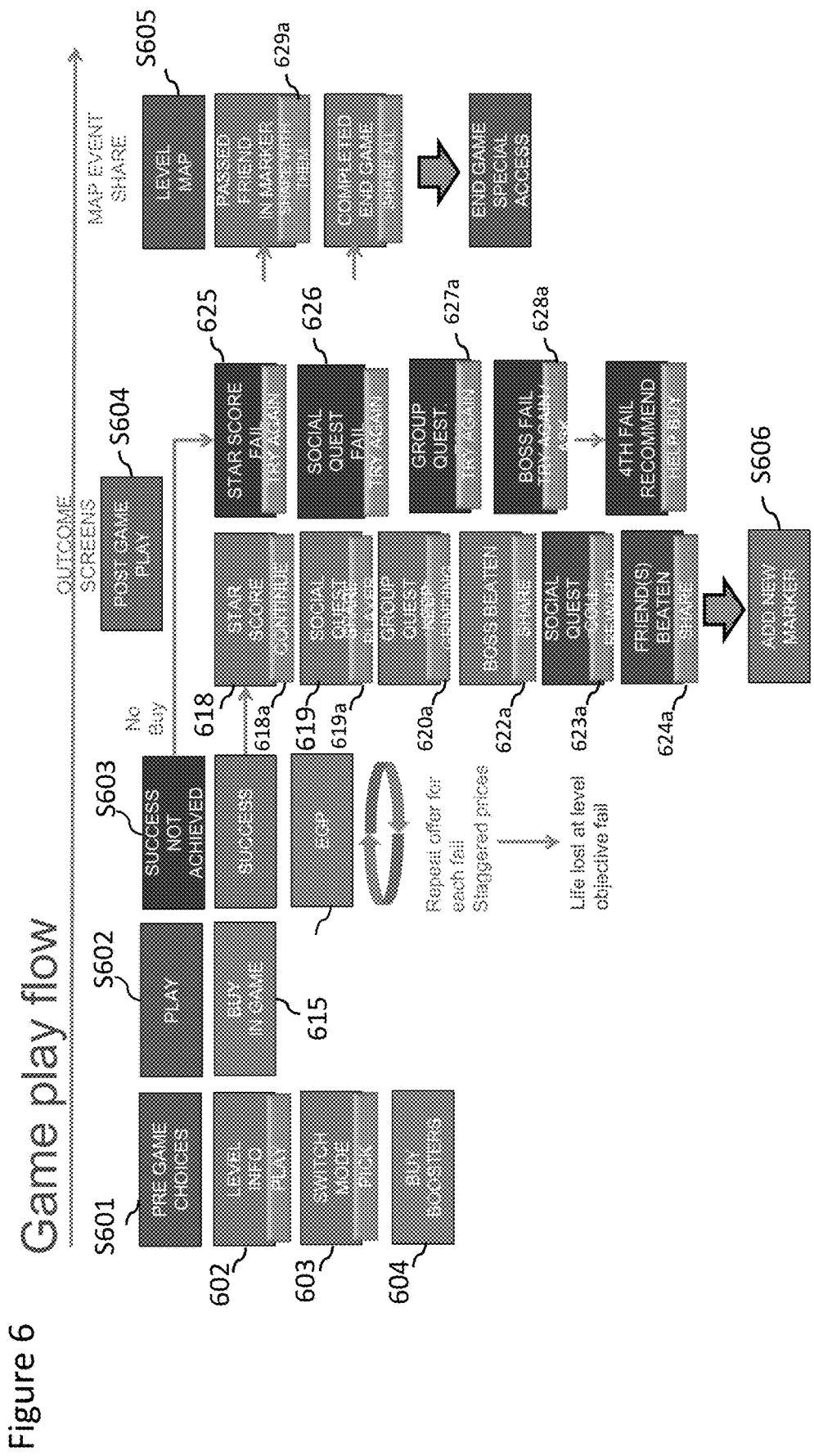
FIG. 6 is a schematic diagram showing game play flow.

FIG. 6 is a schematic flowchart of gameplay flow implemented by the gameplay module 318. Step S601 offers pre-game choices to a user. These include location information so that a user may select which location to play 612, a switch mode option so that a user may pick a particular mode of play 613 and an option 614 for the user to buy boosters. At step S602 a user will play that location in his selected game mode (he may buy boosters in game 615). At step S603 it is determined whether or not the player has been successful. If he has not, he may be offered an endgame purchase 616. The offer will be repeated for each fail at staggered prices. Eventually he will pass or fail the level by achieving the objective or not. Step S604 denotes the option for outcome screens in post-game play. Screens for successful play are shown in the left hand column. In the event of success, a star score is achieved 618 with a continue option

618a displayed for the user. If, a social achievement marker is achieved, a "share player" message 619a is shown, and an electronic assistance message 800 is dispatched to give a gift to the player who is helped. In a group quest the player may be shown the option to keep grinding 620a. In the ultimate mode, if the boss has been beaten, the user is presented with a share option 622a. If a group quest (or social quest) has been successfully accomplished and the player was the greatest contributor, a reward may be collected 623a. If friends have been beaten, this information may be shared 624a with other users. In all of these situations, a new marker is added to the player counter at step S606.

The failure screens are shown on the right hand side under step S604. If the star score is not achieved 625, the user is asked to try again 625a. If a social quest has been failed 626, he is asked to try again 626a. If the group quest has failed, he is asked to try again 627a. If he has failed in the ultimate mode, he is asked to try again 628a. After the fourth fail he is given a recommendation to ask for help or to buy boosters etc. The map event sharing is shown at step S65. If a friend has been passed in a marker, this information is shared with that friend by generating a message which is despatched from the server to that particular friend. If an endgame has been completed, this is shared with the all other users and an endgame special access is granted.

After a certain amount of markers is reached at a particular location, the next location is unlocked for a user. The number of markers required to unlock the next location could vary and could be set at anything from one marker. Note that in this respect the marker is not the same as a game score. A user may have to achieve a certain game score in order to obtain a marker, but the two things are distinct.

The new saga format can use a life mechanic similar to existing Saga games. In one embodiment, the life mechanic rules are as follows. There is a base level of 5 lives. One life is lost for failed level—a failed level is one in which the objective is not fulfilled. A life may be refilled every 30 minutes. Lives may be purchased to top up a full life count. Hearts are dropped by the game selectively at locations where a friend has recently attained a marker. Throughout the game, hearts may be collected along the path, which can act as extra lives.

Figure 7:
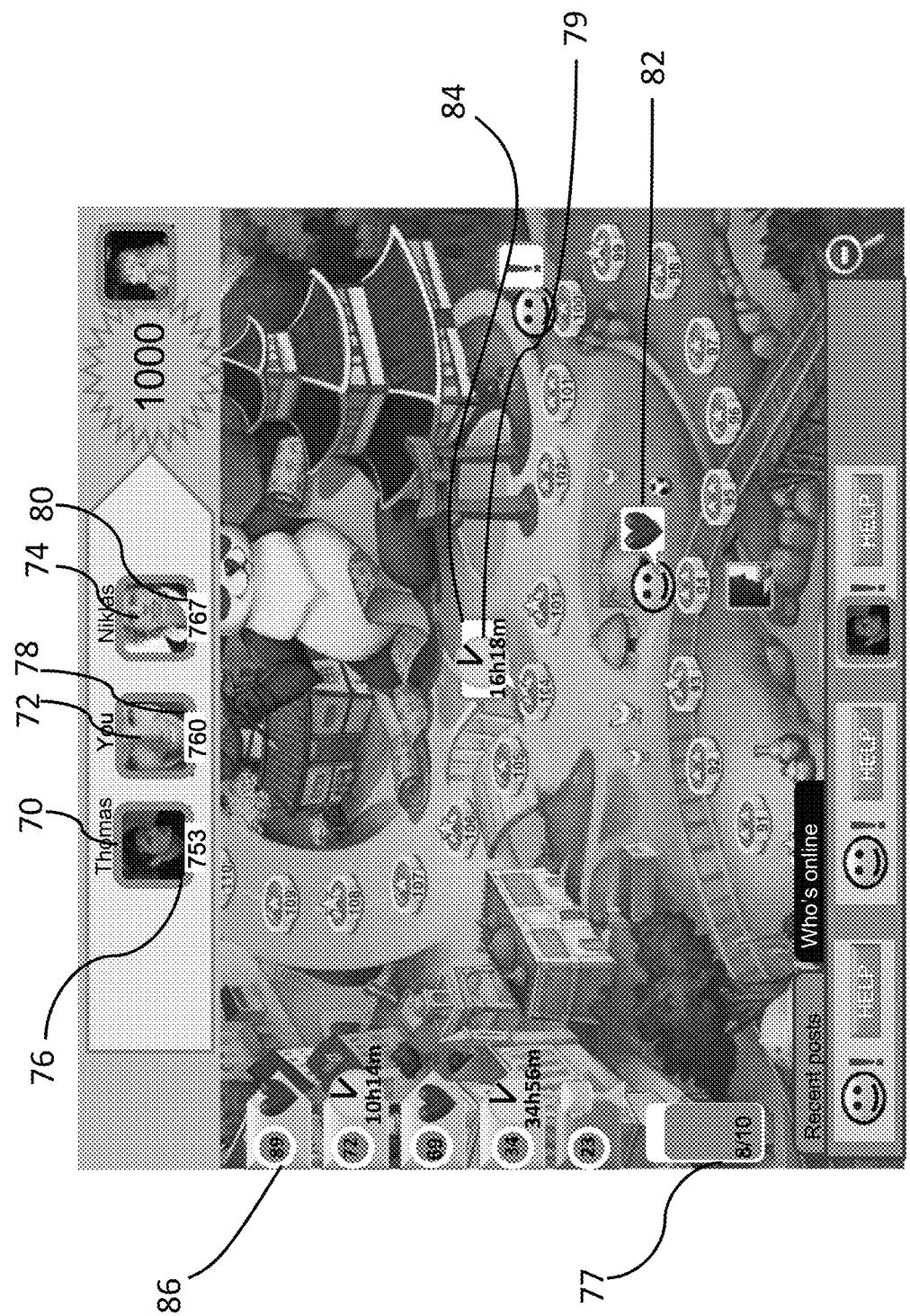
FIG. 7 illustrates another embodiment of presentation of the locations and markers at the locations.

FIG. 7 is an example of a map portion as rendered in a different visual embodiment. The map is vertically scrollable, such that different portions of the map can be rendered on the screen to a user. At the top of the map, progress towards an end game is shown as a global top marker list. Current leaders are clearly identified, illustrated by icons showing contact identifiers (such as faces) 70, 72, 74. The score towards the end game is shown below each contact identifier at 76, 78, and 80 respectively. Time-based events are marked by a group quest identifier such as 84, which can show the amount of time remaining.

Other events which are available on the map, but not shown in the current portion which is rendered to the user, are indicated in a sidebar 86 on the left hand side. According to this sidebar, location 89 and 69 have a social quest available, locations 72 and 34 have a time-based group quest available, and location 23 has an ultimate mode available.

Figure 8:
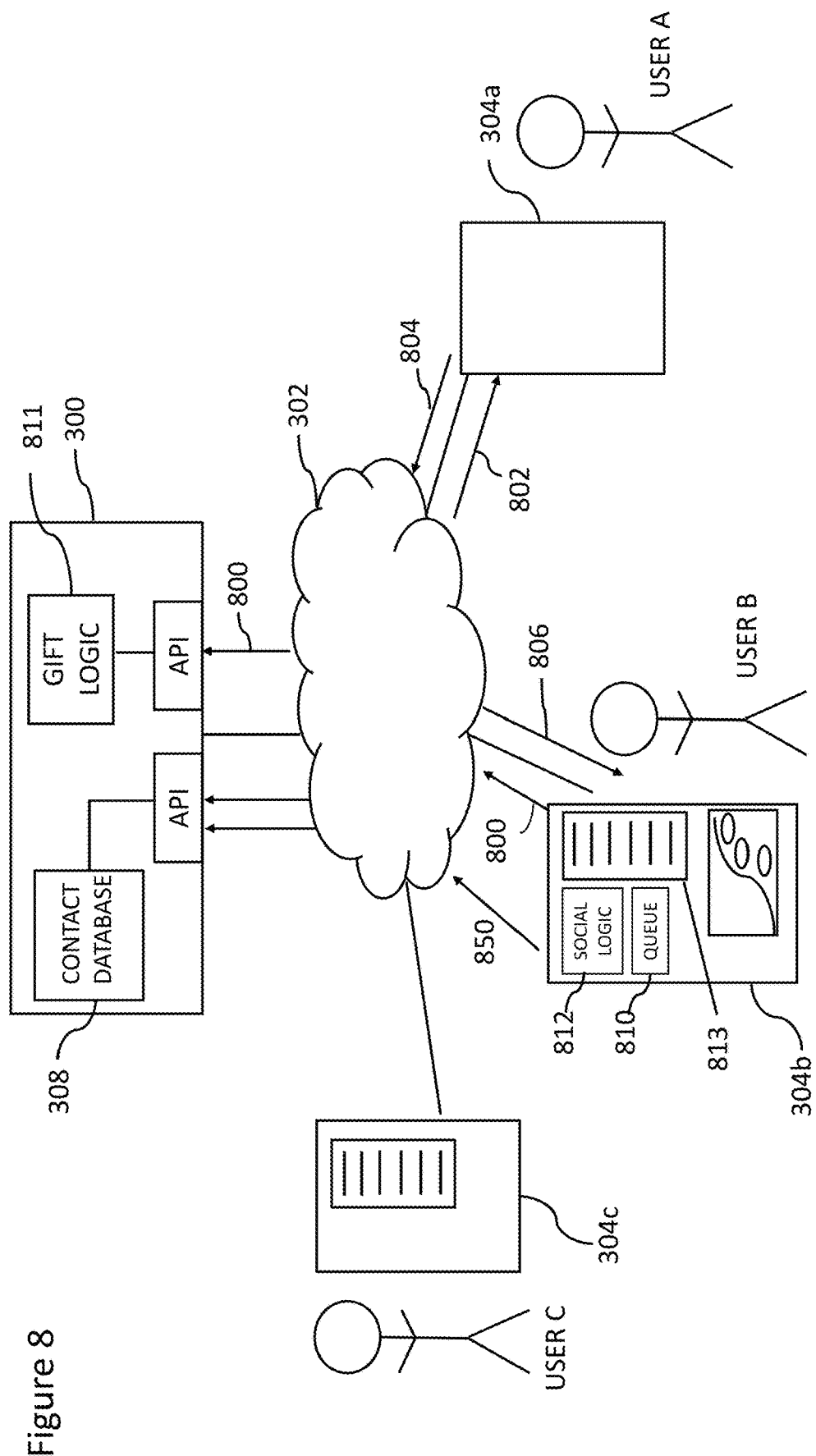
FIG. 8 is a schematic flow diagram of the social mode.

For each particular player, they cannot necessarily see where their friends are located on the map, because a friend may have access to more than one location at a particular time. Instead, the global top marker list shows the progress of friends towards an end game. Furthermore, when a player logs-in, the most recent progress made by their friends is illustrated on the map. 'Progress' is measured by accomplishments. The latest accomplishment of a friend is identified as their earning of a new marker, and they are shown on the map at the location at which they achieve that. By showing friends' latest activities on the map, a direct social interaction is encouraged where a player can receive assistance from friends who are active, and send thanks to them directly. Just to be clear, for a particular player, when he logs-on, the map pans to the location at which he was last playing (see the hot air balloon 19 in FIG. 1), and shows his friend(s) at the last location that they received a marker. FIG. 8 shows a flow chart for the message/gift flow which this makes possible. Markers are displayed only for a limited time so they are fresh, for example, a maximum of one to two weeks. The time for which a friend's marker is displayed is set at the game server.

The client device which is executing the game code, decides what quest is to be offered, and identifies social or group, a level and which marker for that location/level.

For social mode the aggregated user data sets of the friends at the client device is used. This enables the social mode to be played in offline mode.

For group mode a player needs to be online to receive the quest. The client requests a group quest for a certain location/level and marker; the server assigns the client to a group having a group id and provides the group id to the client/user device. The group id is used to track to which group quest at the server the user's results will be attributed.

On receiving the group id a group quest is created and indicated on the display of the client device.

Results of the group quest are reported back to the server to be added to an overall completion score for the level and marker for all users being assigned to that group ID. This could be anyone of all users on the network, i.e. it is not limited to friends.

Results on the group quest are buffered/stored at each client with a group user if it goes offline and transmitted to the server when it goes on line again.

Buffered/stored results will be attributed to the quest total score should the results be reported to the server when the quest is still running.

For each level, mode and marker a set of rules is defined for when that particular combination should be eligible as a quest. In solo mode the requirement is that the player must have completed the previous level with at least one star. For a group or social quest to become available the rule is that a player must have achieved at least two stars on the same level. For ultimate mode at least three stars. These rules are configurable by a game developer. For instance, the rules could say that a player is not allowed to progress beyond level X until he has fully completed all markers on levels 1 to X−1. Once a list of all level, mode and marker combinations that can be played is constructed, the game chooses exactly which one of all the available combinations to choose as a quest. In one embodiment, a valid level, mode and marker combination is picked at random, but this too is configurable. For example, it would be possible that there can be only a single quest per level at a time.

If a social mode quest has been selected using the algorithm described above the actual friend to help is picked from a list of friends with attempts on any level. If the player doesn't have any friend to help no social mode quest is created.

If a group mode quest has been selected the client asks the server to be assigned a group for that specific level and marker.

If the group quest starts with less than the maximum number of participants the client may automatically decrease the required target of the group quest by the corresponding amount as the number of missing players (if the quest has 8 out of 10 players the target is 80% of the original target).

As mentioned, the server assigns users to a group with a groupid. In addition to balancing the groups, if the specifics of the quest teach that 10 users are supposed to be involved, and less than 10 join within a predefined time, then the goal is adjusted. As the group quests have a start time and a finish time that the goal is adjusted after a predetermined time from start. For example after 10 percent of time if the group is not yet full the group is closed and the goals are adjusted to take the "not full" group into account so that it is not harder for the players to complete the group quest if others aren't joining. In an alternative embodiment the goal is kept that the points that were to be completed by the other users is added at that time to take into account the fact that the group is smaller, i.e. the goal remains, but the total score achieved at the predetermined time is adjusted to take into account the reduced number of people—for example goal 1000 for 10 players, current group score of 130 and only 8 players at the predetermined cut off time since start. 20 percent of the players are identified as missing and thus the current group score is adjusted with their pro rata share of the goal, i.e. 200 point are added to the current group score. This enables inconsistencies to be reduced and the group quest to be started before the group is full, i.e. as soon as a first client device requests a group quest on a level.

The social game mode will now be described in more detail. A social game mode is played in accordance with the following rules. In this mode, a player always helps another specific player. That player should preferably be a friend to the player, and on a list of their friends. If the player manages to succeed in completing the level objective, a gift is sent (which may be specific to the given level) to that friend. The gift (for example, extra moves or a booster) is intended to be used for a particular level by the receiving friend. The gift can be used at that location in any game mode. In another embodiment, the gift could be used at any location by the recipient friend (not just on the level which was played by the player which sent the assistance). The gift is sent from the server following receipt of an electronic assistance message from the player which indicates that the player has achieved the objective. In one example, Player B has a social mode quest to help player A. Player B has to play and complete a level at location X with score Y. If the player completes level X with score Y the social quest is completed and player B gets a choice to "send help" to player A. If player B chooses to "send help" (button 1303 in FIG. 13B) to player A the help (often in the form of a booster) gets delivered via the server to player A the next time player A starts the game. When the help is sent from player B it is also specified for which level the help can be used. The help may be specified to be used at the level where player A failed last. Player A can then use the help on that particular level only. When player A accepts and uses the help a thank you is sent back to player B. In one embodiment, the server sends the gift to player B even if player B doesn't decide to click on "send help". In another embodiment, player A is required to accept the received help.

One possible challenge in social mode is that for a player to earn a social mode marker, they need to have a friend who requires help at that location. This can be solved by decoupling the location connection. Thus, a player may achieve a certain objective at one location which generates a gift, but that gift may be used by the recipient friend at another location. The only link is through the people. Thus, there is no location matching needed. A player will always provide assistance to their friends, but the location they receive the help on can be different from the location where was played to obtain that help. Recipient friends will always get help on an active location. This can be any location where there is an open current marker for that friend. For solo or ultimate mode, it could be any time. For social mode and group mode, the social mode or group mode event has to be ongoing. The mode that a player claims it for depends on which mode the location is played next time. In some embodiments it is possible to have the help on any level the server deems help is needed on as soon as it has received "help complete" indication message from a user. For example, when Player B helps Player A on level 45, i.e. a social quest is created and offered to B at level 45. There are two outcomes: (a) A gets help on level 45 (he needs it), or (b) because it can take days before completion is reported as A or B may be offline or only play sporadically, at that time A may no longer need help on level 45 anymore (e.g. A has competed all markers on that level). To cover this outcome, an alternative embodiment may include the additional steps of determining if the level indicated in the help complete message is already completed for A (full markers). If not, help is provided to A on level 45, and if so, then the server identifies a different level A currently needs help on and provides help to B (according to the normal procedure) on the different level where he currently "needs" help. Thus, the help is sent to a specific level. It doesn't have to be the same level as "the helper" is playing, but it is a specific level.

As with the solo mode, a location may be played at different difficulty levels. As a player replays a level three times, each social mode marker is slightly harder to earn. This could be achieved by altering the level design, or altering the objective for each replay of the level.

The gift which is received by the recipient friend should preferably be aimed to have more value than just extra lives. For example, a gift could be plus five moves or a free booster. A friend who wants help is identified at the server for example, according to the following rules:

Has the friend reached a level at which they can be helped?
Do they have a maximum of five pending helps?

FIG. 8 is a schematic diagram showing the message flow for social mode quests. The architecture is the same as in FIG. 3, where each of the user devices 304a, 304b, 304c, is shown associated with a respective user, user A, user B, user C. The Social logic 812 in the game (e.g. at user B) operates rules for determining whether or not to set a particular player, e.g. a player A into a help loop (queue) 810. These rules include:

Determining whether a user has successfully unlocked a location at which he is requesting help.
Does the user have more than five pending helps?

For this, aggregate data in the content memory 813 at the user device is used.

The client device of user B creates a social quest/event based on aggregated data of each friend for example user A. If user B completes the quest a message is generated and sent to the server that user A has been helped by user B. User A's device is let know that he has been helped when user A selects the level for play in any mode. The client does a call 850 a dedicated social quest server API endpoint when the app is started. The call returns zero or more "help items". Each item contains information about what the help is (item type and amount), which level it's intended for and who it's from. The actual level a player is helped on may be decoupled as described above, so that the link between the users remain but the actual level the player is helped on is a level he currently needs help on not necessarily the one that the user B played to help. For example user A may have completed all markers on the level, when the server receives the indication that the user have been helped. So the help transcends levels and becomes a real help on a level where User A has not completed all markers.

Figure 9:
FIG. 9 is an illustration of a message indicating that help is available.

The event is shown on a map, e.g. 14 at New York 4 in FIG. 1, to the player user B. If the user B responds to the social mode invitation by playing the level at the location at which it is indicated on his map, and successfully achieves the objective, then an electronic assistance message 800 is sent from terminal 304b to the server 300. The electronic assistance message is processed by gift logic 811 which determines what gift or help should be supplied to user A. The appropriate gift or help is supplied in message 802. When the user A receives the electronic message, it is rendered to him on his screen, for example, as a friend-driven booster in his game. It may be illustrated with the identity of the person who transmitted it (for example, user B). FIG. 9 shows how the extra help may be shown. When the gift is used, a return social event (for example, a thank you) is triggered 804.

Figure 10:
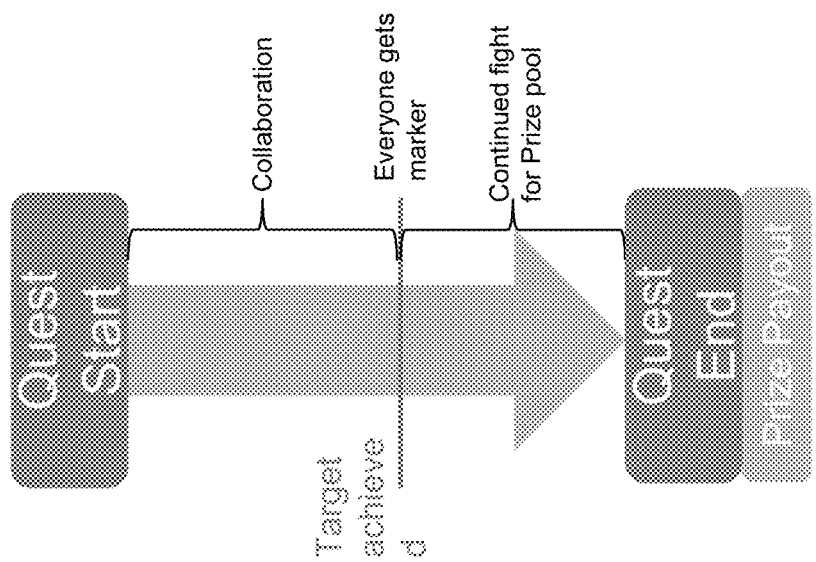
FIG. 10 is a schematic diagram illustrating the concept of group game mode.

Group quest gameplay will now be described in more detail. This provides a group target model within an associated time limit. FIG. 10 illustrates a timeline for a group quest game mode. A group quest is requested by client, and a group established by the server 300. A group of players is selected for partaking in the quest. This group may be selected as a group of friends (people connected in a contacts graph according to the contacts database), or can be selected at random by the server. Players selected at random might, for example, share a common geographical location. The server determines at what location the group quest is to be played. The group quest is made available by sending a game mode object to the selected players to be rendered in the map when these players next log-on. FIG. 7 shows at item 84 a group quest available at location 104. FIG. 1 shows a group quest at New York 1, 2 and 3. A group quest has a time limit for achieving the quest and this is indicated by a time indicator. The group should not be able to complete the objective before the set time limit. Where a particular target has been set, and this target is achieved before the end of the set time limit, then play is allowed to continue in the group mode until the end of the set time limit. In a group mode quest, each selected player enters the location at which the group mode is available. They are each issued a starting game board. They play the game board individually as solo players, aiming to achieve the particular target that has been set for the group. The contribution made by each group member to the target is recorded in game play. As shown in FIG. 10, when the group target has been achieved, everyone in the group receives the group mode marker for their counter at that location. Play is allowed to continue, and a final score which is obtained is then used to determine who was the greatest contributor. The greatest contributor receives a separate prize. Thus, the group mode quest starts out with a collaborative model (up to attainment of the target) and then shifts to a competitive model where the most active players will continue to seek the prize.

In order to align player focus, the model which is used for the game mode is to make the game mode objective (in solo play of the game) the same as the collection target. This ensures that players do not get conflicting objectives. For example, a level objective for the game at that particular level could be to save puppies, and the group quest objective could be to save a hundred puppies. In another example, if the quest target is to collect pandas, then the level completion objective is to save a minimum of eight pandas in each level play. As already mentioned, over achievement (collecting more puppies or pandas) is allowed as long as it is within the set time period. An activity incentive can be provided in the form of a recurring bonus for actively playing. To encourage players to be active in the group quest, a bonus can be added on the target achievement for each day that a player plays. So for the second day in a row, the player would get plus one on everything collected per game round. In the third day, they could get plus two on everything collected.

Group quest gameplay modes can vary in their difficulty and quest templates. As already mentioned, the new Saga Format is not necessarily played in sequence. In fact, in order to achieve the three group quest markers, it is necessary to replay group quests at the same level. To provide variation when a player receives a quest on a level at which they have already played, and also to be able to vary challenges over time, a template system is utilised. Template settings include:

Group size, number of players

Duration in days or hours

Prize pool: number of winners and prize for each position

Target for the group to achieve, based on the level objective

Using templates allows for flexibility and means level designers only focused on level design and group target setting.

At the end of the quest time, a group will either have successfully completed the objective or failed to do so. If it has failed, no marker is awarded and no prize is paid out. If, however the group has been successful, all players are alerted through a push notification (web or mobile). A player has to return to the game to see the results and claim the marker as well as a potential prize. For the non-prize members of the group, they might be prompted to thank top players.

Figure 11:
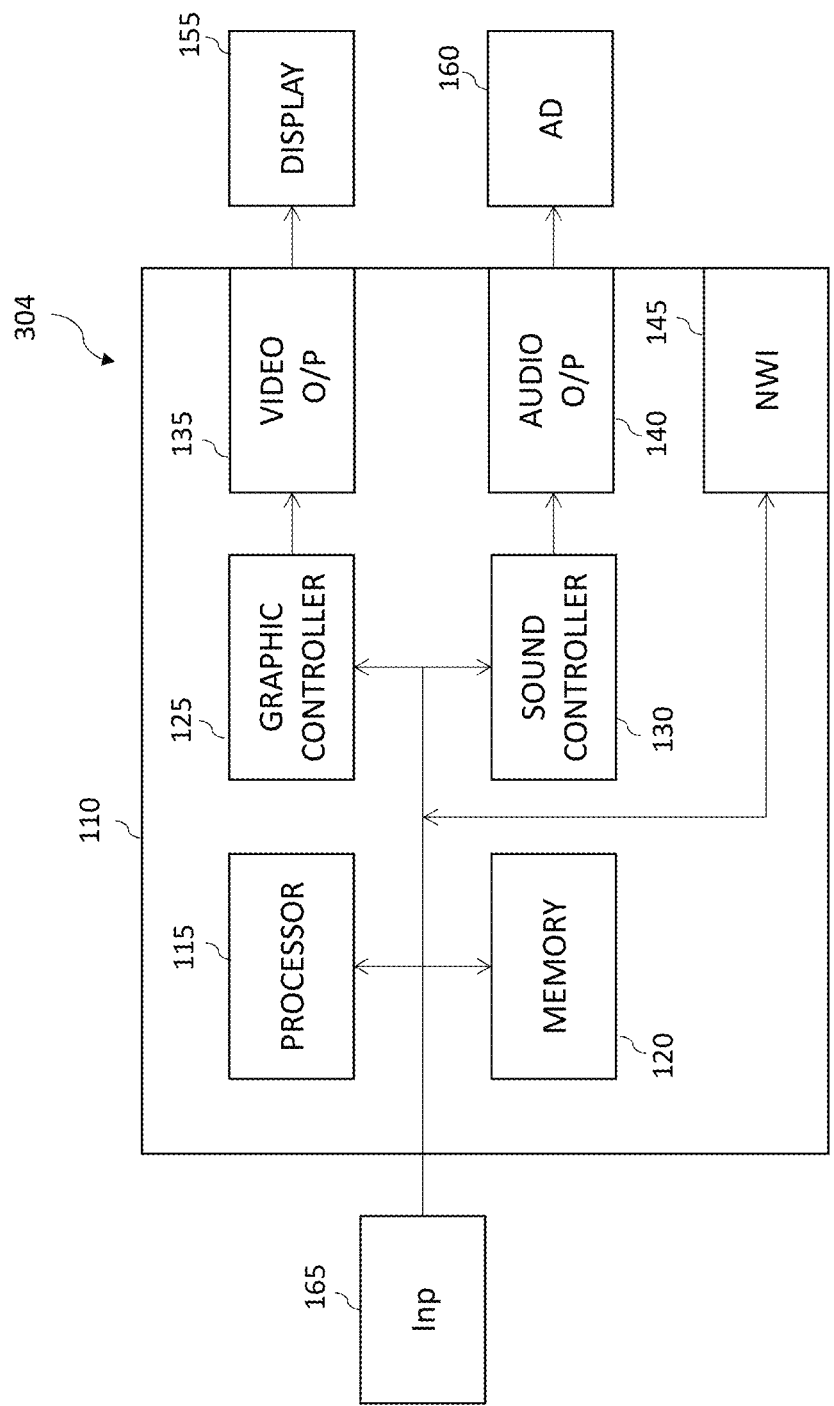
FIG. 11 is a schematic block diagram of a user device.

A schematic view of a user or computing device 304 according to an embodiment is shown in FIG. 11. All of the blocks shown are implemented by suitable circuitry or computer code executed in a processor. The user device has a controller part 110. The controller 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other via an interconnect such as a bus or any other suitable interconnect and/or by point to point communication.

It should be appreciated that in some embodiments, the controller 110 may be implemented by one or more integrated circuits, at least in part.

The user device is shown by way of example only. In alternative embodiments, one or more of the parts may be omitted. Alternatively or additionally, some embodiments may comprise one or more other parts. Alternatively or additionally, one or more parts may be combined.

The game server 300 may communicate via the network 320 to the one or more user devices 304a, 304b, 304c and may further provide connections to a social network such as Facebook™. The server 220 may be able to obtain user information via the social network. Such user information may include contacts of the user.

It should be appreciated that embodiments may be deployed in different system architectures. For example, the computer game may be implemented as a computer game that is stored in the memory 120 of the user device 320 and is run in particular group and social modes on the processor 115 of the user device 100. However when online, the server 220 may handle some elements of the game in some embodiments. By way of example only, a Java game applet may be provided to the user device 100 and the locally running Java applet will generate, for example, the graphics, sounds, and user interaction for the game play on the user device 100. Java applet can have sufficient information to allow offline play when the user device is no longer in communication with the game server, e.g. if connectivity is lost. When online, data may be fed back to the server 220 to allow interaction with other user devices 304, as in the group and online social modes.

In some embodiments, the game may be implemented as a computer program that is stored in a memory of the system, for example the server 300, and which runs on the processor of the game server. Data streams or updates are supplied to the user device 100 to allow the user device 100 to render and display graphics and sounds in a browser of the user device 200.

Figure 12:
FIG. 12 shows an entry lobby at a location.
Figure 13A:
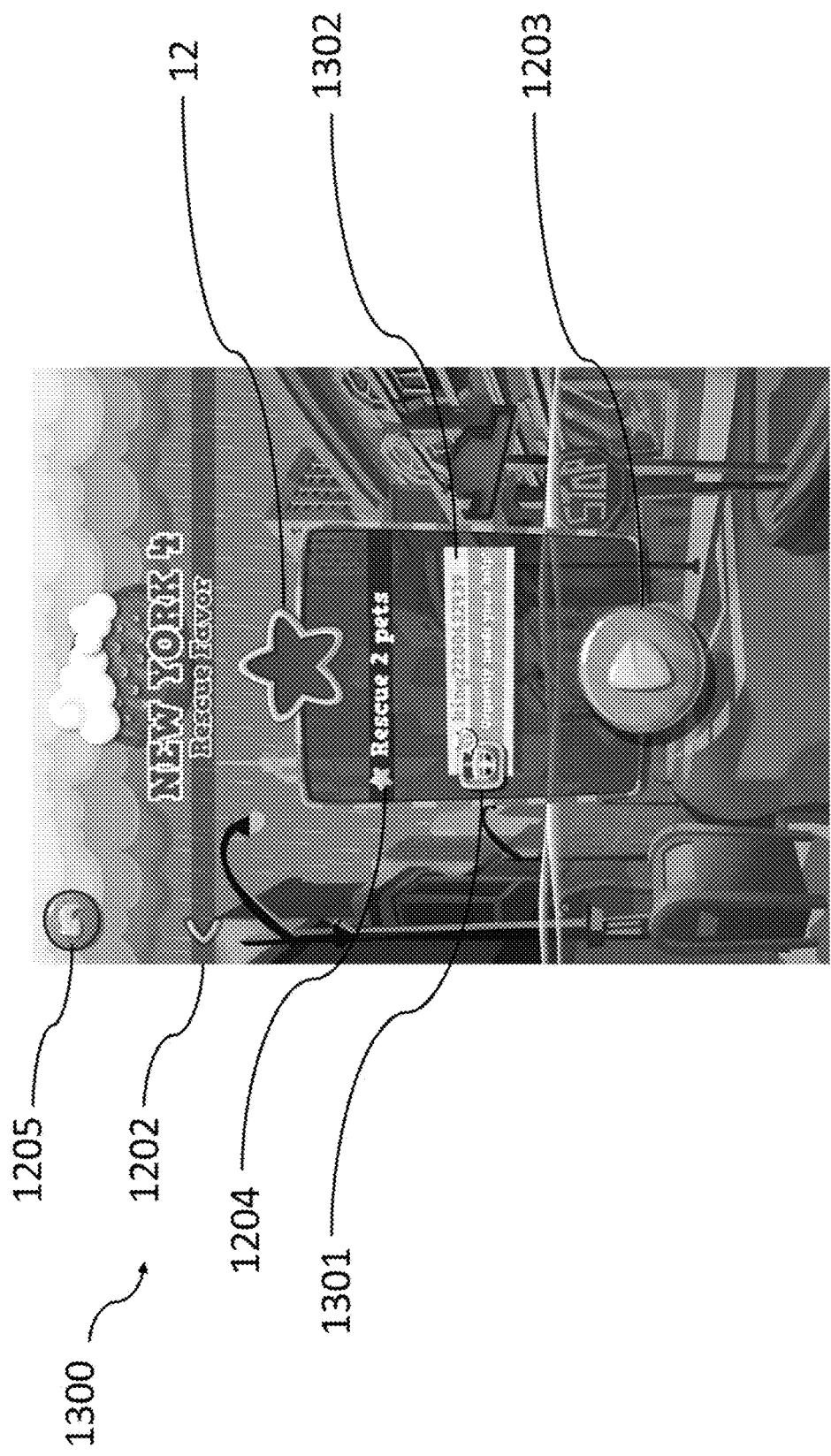
FIG. 13A shows an entry lobby having been swipe to denote social mode.
Figure 13B:
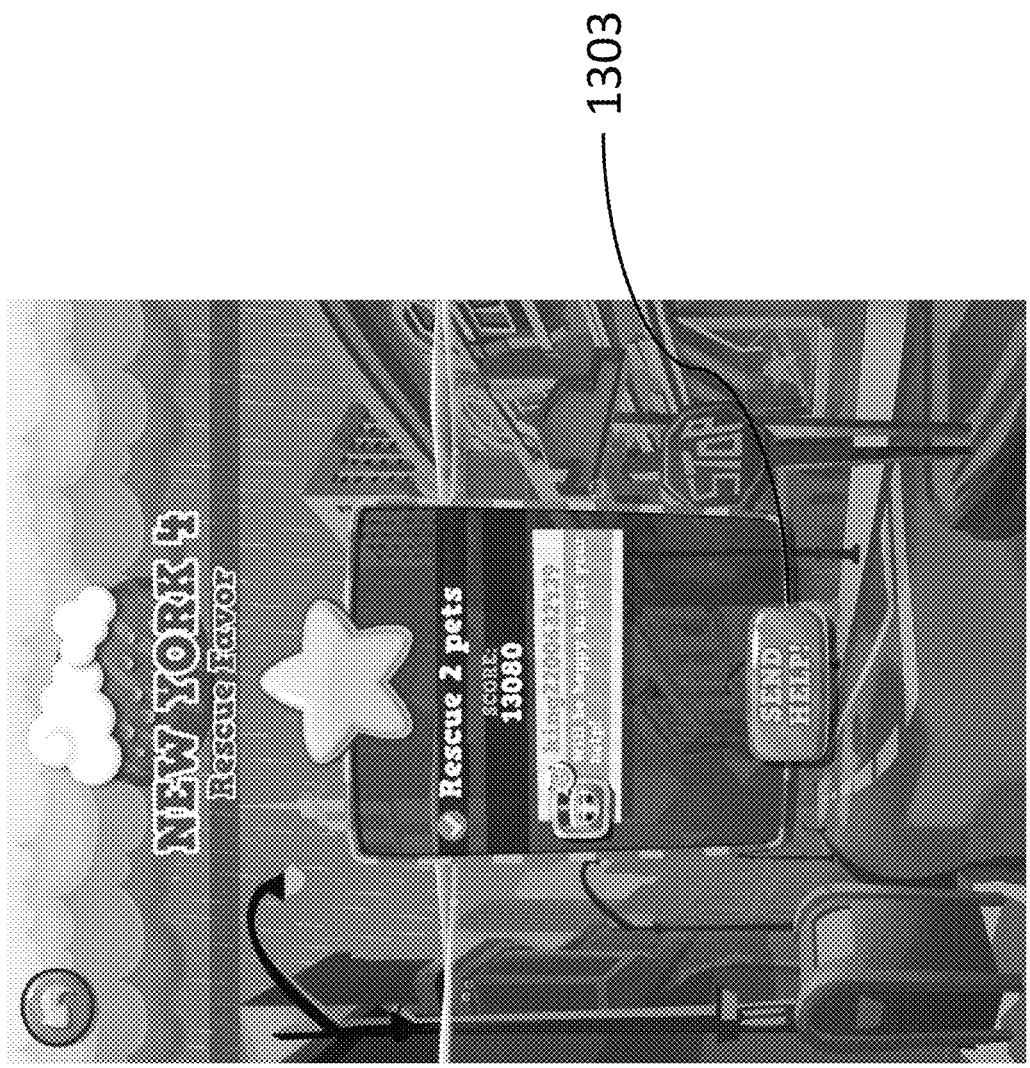
FIG. 13B shows the lobby when a social quest has been successful.
Figure 14:
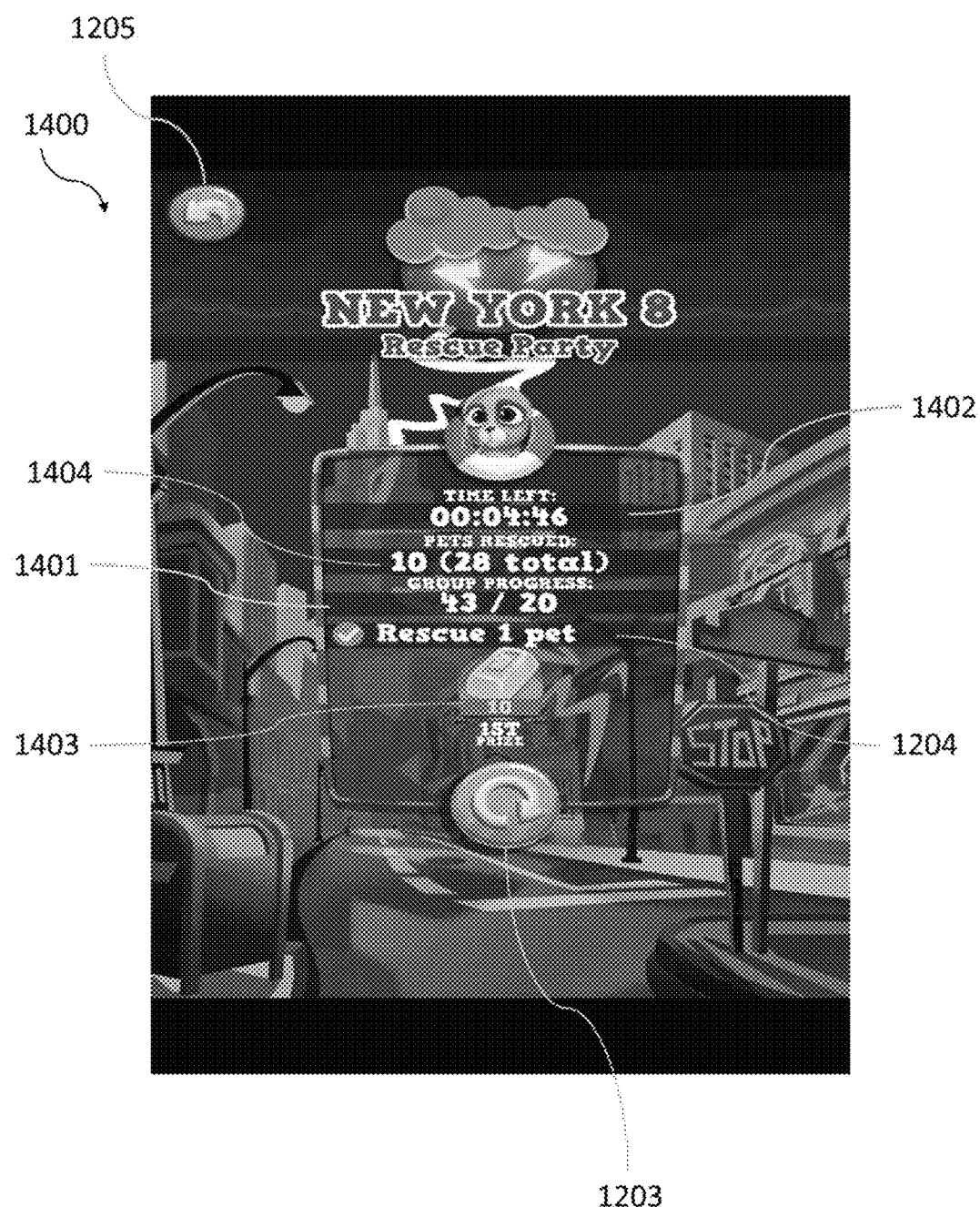
FIG. 14 shows an entry lobby having been swiped to indicate group game mode

FIGS. 12-14 illustrate an example lobby screen associated with a particular location, wherein a user may navigate to the lobby screen by selecting the location indicator associated with the location.

FIG. 12 shows a first instance of a lobby screen 1200 associated with a particular location. For each particular instance of a lobby screen 1200 there is associated a particular game mode, represented by game mode indicator 1204. Each game mode has with it an associated objective, which is indicated by the game mode indicator 1204. In this particular case, a player must rescue 3 pets without seeking assistance from other players (i.e. "regular star mode"). Each particular game mode also has with it collectable items; in this case, the player is able to collect 3 "stars". The collectable items associated with a particular game mode are represented by markers 12. The number of markers associated with the location is denoted by marker indicator 1201, where, in the present example, marker indicator 1201 indicates that a player has collected 4 out of a possible 9 stars associated with the location. Marker indicator 1201 can be used as an alternative or in addition to the player counter of FIG. 2. A user may navigate back to the "saga view" by selecting the path mode selector 1205. A player may commence playing a particular game mode by selecting the "play" button 1203. A player may also swipe to another instance of a lobby screen (associated with the same location) and access another game mode, by swiping away from the direction indicated by the swipe indicator 1202.

FIG. 13A shows a second instance of the lobby screen associated with the same location mentioned above (herein referred to as "lobby screen 1300"). Lobby screen 1300 comprises a game mode identifier 1301 that informs the user that another player, e.g. one of their contacts, requires help in order to complete a level (i.e. "social mode"). The other user is denoted by an identifier 1302. The marker 12 associated with lobby screen 1300 indicates that the player is yet to complete the objective associated with this game mode. The swipe indicators 1202 also indicate that that a first and third instance of the lobby screen may be navigated to by a user, by performing a swiping motion (in the same way as described above). FIG. 13B shows a screen with the game objective complete and the 'send help' button 1303 showing.

FIG. 14 shows a third instance of the lobby screen associated with the same location mentioned above (herein referred to as "lobby screen 1400"). The third instance of the lobby screen 1400 includes a time indicator 1402, denoting the amount of time that is left for a player to participate in the particular game mode associated with lobby screen 1400. The game mode indicator 1204 for lobby screen 1400 indicates that a user must play in collaboration with at least one other player in order to complete the game objective (i.e. "group mode"). Lobby screen 1400 also includes a progress indicator 1401 that indicates how far the group (of which the player is a part of) has progressed in completing the level objective. The progress indicator 1401 may be used as alternative or in addition to a progress bar. Reward indicator 1403 indicates the rewards that are available for completing the game level and the number of points that must be obtained in order to acquire one of said rewards.

In the earlier description, 'thank you's' have been mentioned. These provide an important mechanism for improving social engagement.

When a predefined number of "thank you's are "received", whether from non-prize group members or from social quest thank you's, a prize may be offered to the user. The server may track thank you's associated with players and award the prizes.

A thank you can be generated in three ways:
  When a player has received and accepted help in social mode a thank you is sent back to the player that provided the help
  When a group quest has ended you can thank the winners (e.g. the players who won gold bars and thus contributed the most)
  Friends are shown on the map where they last completed a level. When a player has completed a new level, mode and marker that player will "drop" a life (a heart) on the map, next to the avatar. This life can be claimed by other players. When a life is claimed a thank you is sent back to the player that "dropped" the life. This concept of dropping lives replaces the old life request message flow found in previous Saga format games.

When a player has received a predetermined number of thank you's (configurable on the server) from other players the player is rewarded an item of some kind (configurable on the server). This gift can be claimed and used in-game.

The number of thank you's a player has attained may be shown as a progress bar 77 that fills up. The predetermined number could for example be 10.

First and second game modes will now be described. These game modes may be used together in one game or may be separately used. These game modes may be incorporated in any one or more of the different modes described previously. They may be present in the same or different levels.

In generally the first and second game modes have a game board with a plurality of game elements 20. The game elements can be one of a plurality of different objects. For example, at least some of the objects may be of different colours. An object may provide a so called booster function. An object may be a blocking object. Each game element is supported by a tile.

In the example of the match game shown, a user is able to select a plurality of objects having a same characteristic and those selected objects are removed from the game board. This may provide the combo feature referred to previously. This may be done by the user interacting with a user interface. In the case where the user interface is provided by the touch screen, the user is able to touch the touch screen at the location where a first selected object is displayed in order to select those plurality of objects. In some embodiments, it is enough that the user selects one object and this will cause the selection and removal of all other objects having the same characteristic as the selected one object having a defined relationship with the selected one object. This is explained in more detail later. The matched game elements are removed.

Figure 15:
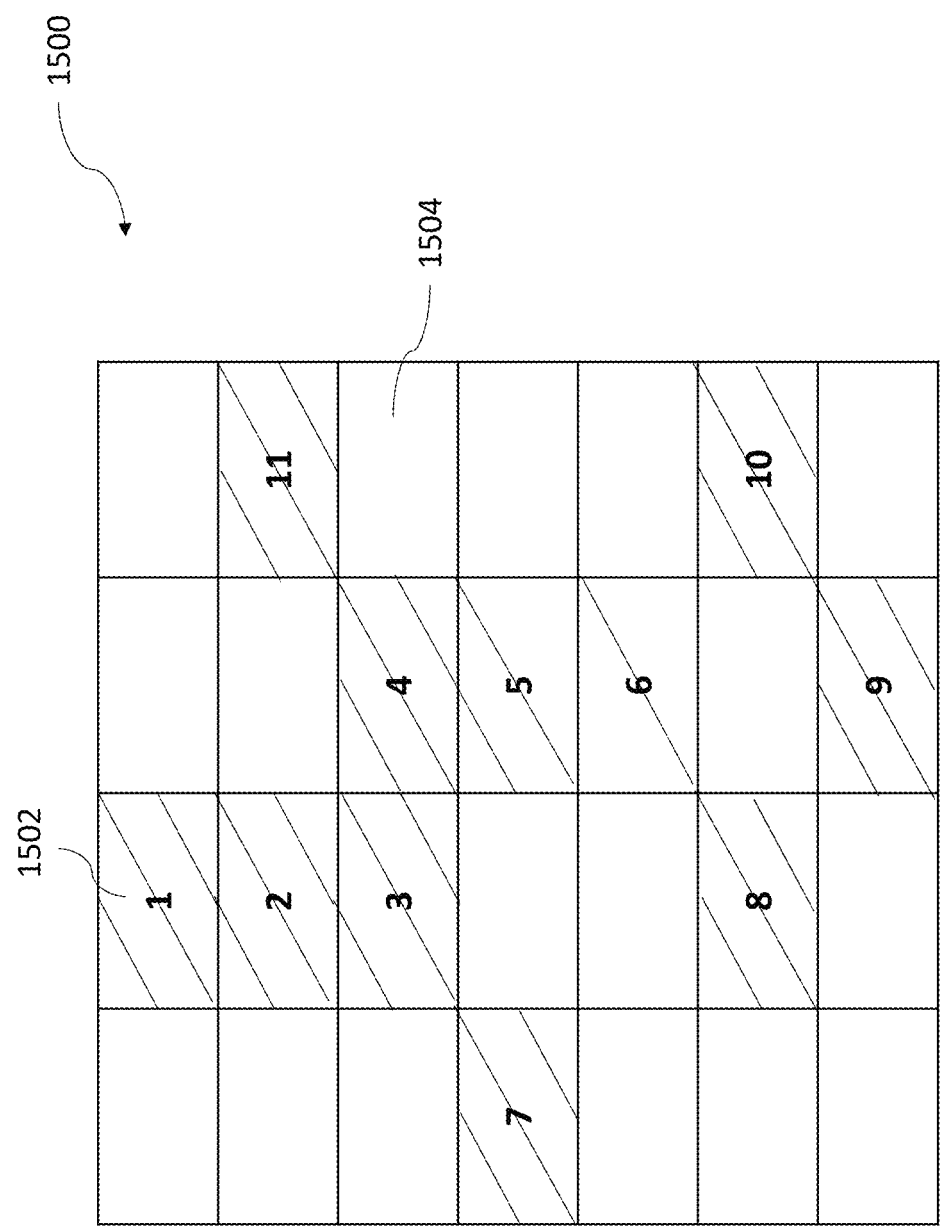
FIG. 15 schematically shows a game board during a first game mode.
Figure 19:
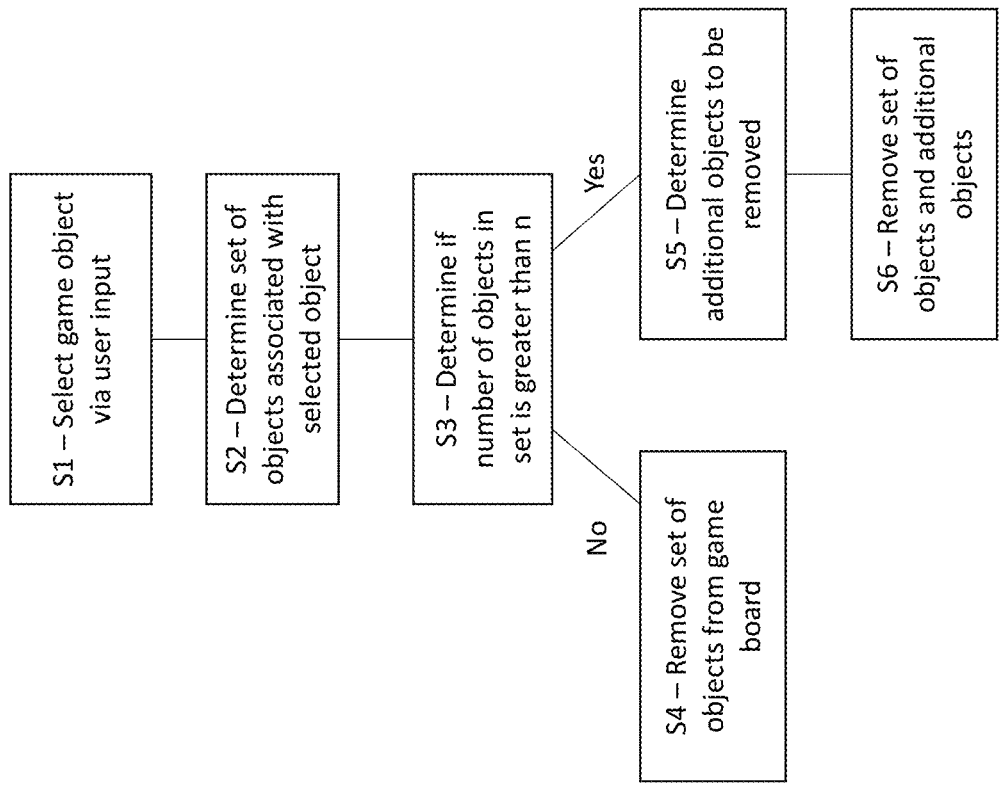
FIG. 19 shows a method associated with the first game mode.

Reference is now made to FIG. 15 which shows a game board 1500 associated with a first mode and FIG. 19 which shows an associated method.

In this example, those objects 1502 which share a common characteristic are shown with the shading and are numbered 1-10. It should be appreciated that this common characteristic may be a common colour, shape, representation and/or the like. The other objects are referenced 1504 and may have any other characteristic.

In step S1 a user has selected, say the object referenced 5 of the game board shown in FIG. 15, via the user interface.

In step S2, the set of objects associated with the selected game object is determined. In accordance with the usual rules, the objects 1 to 6 are selected for removal as each of the objects has the same characteristic and is either directly adjacent the object referenced 5 or next to an object which is indirectly adjacent the object referenced 5. In the case of an indirectly adjacent object, that object will be adjacent another object of the same characteristic which is directly or indirectly adjacent to the object referenced 5 and so on. It should be noted that in this example, objects 7 to 11 would not be considered to be directly adjacent or indirectly adjacent to the object referenced 5. However the rules which define a set of objects may be different in different embodiments.

In some embodiments, the behaviour is determined by the number of objects which is in the set. Accordingly, in step S3, it is determined if the number of objects in the set is greater than or equal to n. n can be any suitable integer. Typically n will depend on one or more factors such as the difficulty of a level, the size of the game board, the number of different characteristics, and/or the like.

If it is determined that the number of selected objects in the set is less than n, then the next step is step S4 where the set of objects is removed from the game board.

If it is determined that the number of selected objects in the set is greater than n, then the next step is step S5. In this step it is determined if any one or more other objects satisfy a criteria. In this embodiment, the criteria is that the other objects share the same characteristic as the objects in the set and have a predetermined positional relationship to one or more of the objects of the set. The predetermined positional relationship may be any suitable relationship such as less than x tiles away from one object of the set or the like. In this example shown in FIG. 15, the positional relationship is that the object is diagonally adjacent an object of the set. In this example, objects 7 to 11 are determined to have the predetermined positional relationship. Different rules may be used in different embodiments to define the positional relationship.

In step S6, the set of objects and the additional objects satisfying the positional relationship are removed.

In some embodiments, before the user makes any selection, any group of objects which would form a group of n or more objects having the same characteristic and able to satisfy the requirements to form a set may be displayed in such a way to highlight this set to the user. For example the group may be displayed in a visually different manner to the other objects. For example the group of objects may be displayed with a different visual effect such as a shimmer or the like.

In some embodiments, when the objects are removed, new game objects fall into place from the top of the game board in order to fill any spaces created. The new game objects may be generated at random. The user then has a new game board on which to play a subsequent move. However, as will be discussed later, in some embodiments, more complex physics may come into play.

Reference is made to FIGS. 16*a*, 16*b*, 17*a*, 17*b* and FIG. 20 which show another game mode.

In the example shown a level 1608 is provided across the game board. One type of game object can only be removed from the game board when this upwards game object is above this level. This game object, which is referred to a bubble object, has an upwards physics. In other words, the bubble game object will tend to move in the direction of 1606 whilst other game objects will tend to move in the direction of arrow 1604 in the downwards direction. As will be discussed, the bubble object will change the behaviour of objects which are above the bubble, and movable, to have an upwards movement.

In some embodiments, the bubble game object is provided in combination with one other game object. In some embodiments, the other object may be object which is to be captured in order to achieve a game objective. This object will be referred to a capture object. In some embodiments, the capture object may be released when the bubble object around the capture object is removed. The bubble object is removed when the combined capture object and the bubble object are above level 1608.

In some embodiments, the bubble object may be provided in combination with an object which can be matched. When the object is matched, the matched object is removed and the bubble object is then associated with another object. The another object may be the object which has a given positional relationship with the removed object. This will then provide a new combined object. In some embodiments, the positional relationship of the another object will be above the removed object.

In some embodiments, the bubble object may be provided in combination with an immovable object. The immovable object may be removable in some games with the use of a booster or the like. Again in that case, the bubble object will then be associated with another object. The another object may be the object which has a given positional relationship with the removed object. This will then provide a new combined object. In some embodiments, the positional relationship of the another object will be above the removed object.

Figure 20:
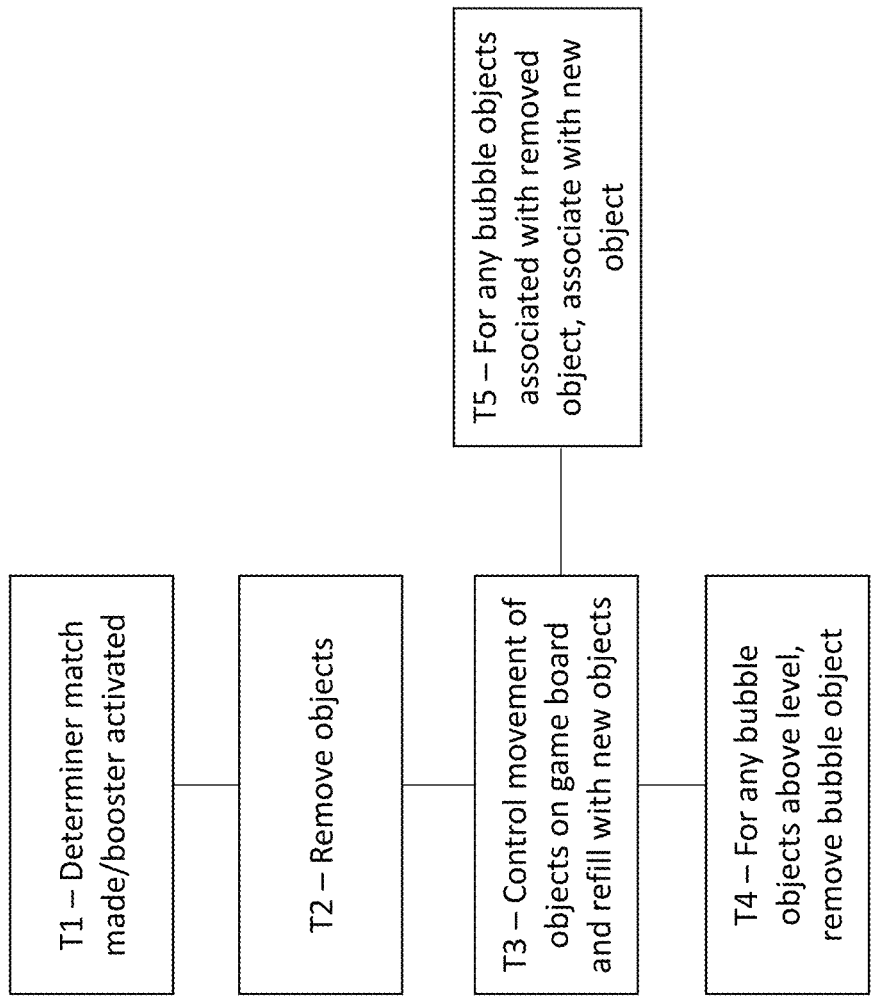
FIG. 20 shows a method associated with the second game mode.

Reference is made to FIG. 20 which shows a method associated with the second game mode.

In step T1, it is determined that a selection of objects to be removed has been made and/or that a booster has been activated. The selection may be the selection of two or more objects which have the same characteristics. In this regard, the selection may be as described in relation to the selection of the set of objects of FIG. 19. In some embodiments, a selection of a set of objects is made by the user interacting with the user interface to select one of the objects of the set. The objects of the set have the same characteristic. In other embodiments, a booster may be activated by being selected by the user via the user interface and/or in consequence of a group set of game objects being selected and subsequently removed.

In step T2, the objects of the set of objects and/or the objects which are to be removed as a result of the booster activation may be removed.

In step T3, a physics engine will control the movement of the objects on the game board and will refill, if necessary with new objects. As will be described in more detail later, depending on the position of the bubble objects, some objects on the game board will move in the upwards direction, whilst other of the objects on the game board will move in the downwards direction.

In this step T4, any bubble object which is above the level, will be removed. Depending on the object with which the bubble object is combined, that object may be removed from the game board or remain on the game board. Capture objects are removed. Other objects may remain on the game board.

In step T5, for any bubble object associated with a removed game object, and where the game object is below the level, the bubble object will be associated with a new object to provide a new combined object.

It should be appreciated that steps T4 and T5 can take place in any suitable order. In some embodiments, steps T3, T4 and T5 may be performed as part of a single operation. In some embodiments, the steps T3, T4 and T5 may be performed as a part of an iterative process.

Figure 16A:
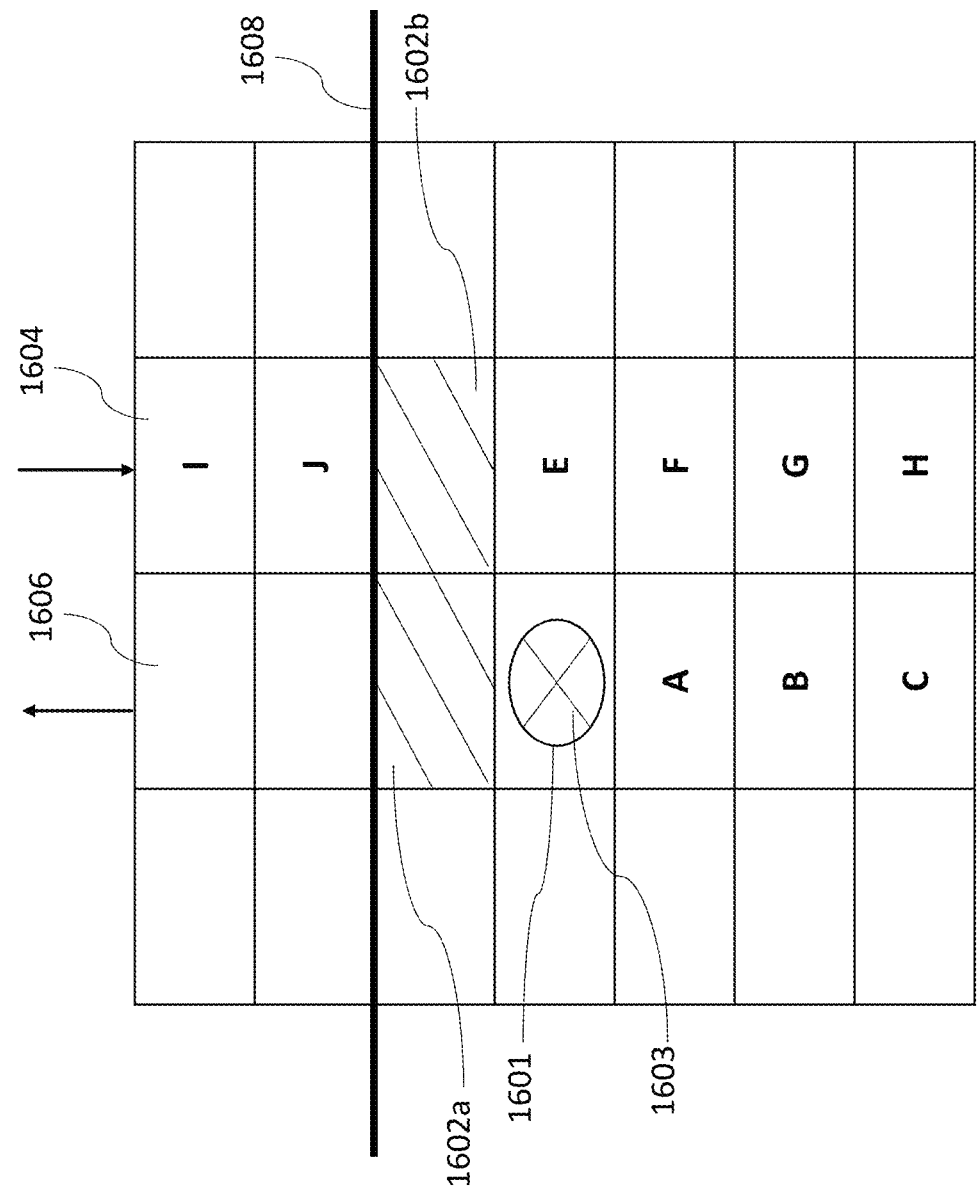
FIGS. 16a, 16b, 17a and 17b schematically show a game board at different times during a second game mode.
Figure 16B:
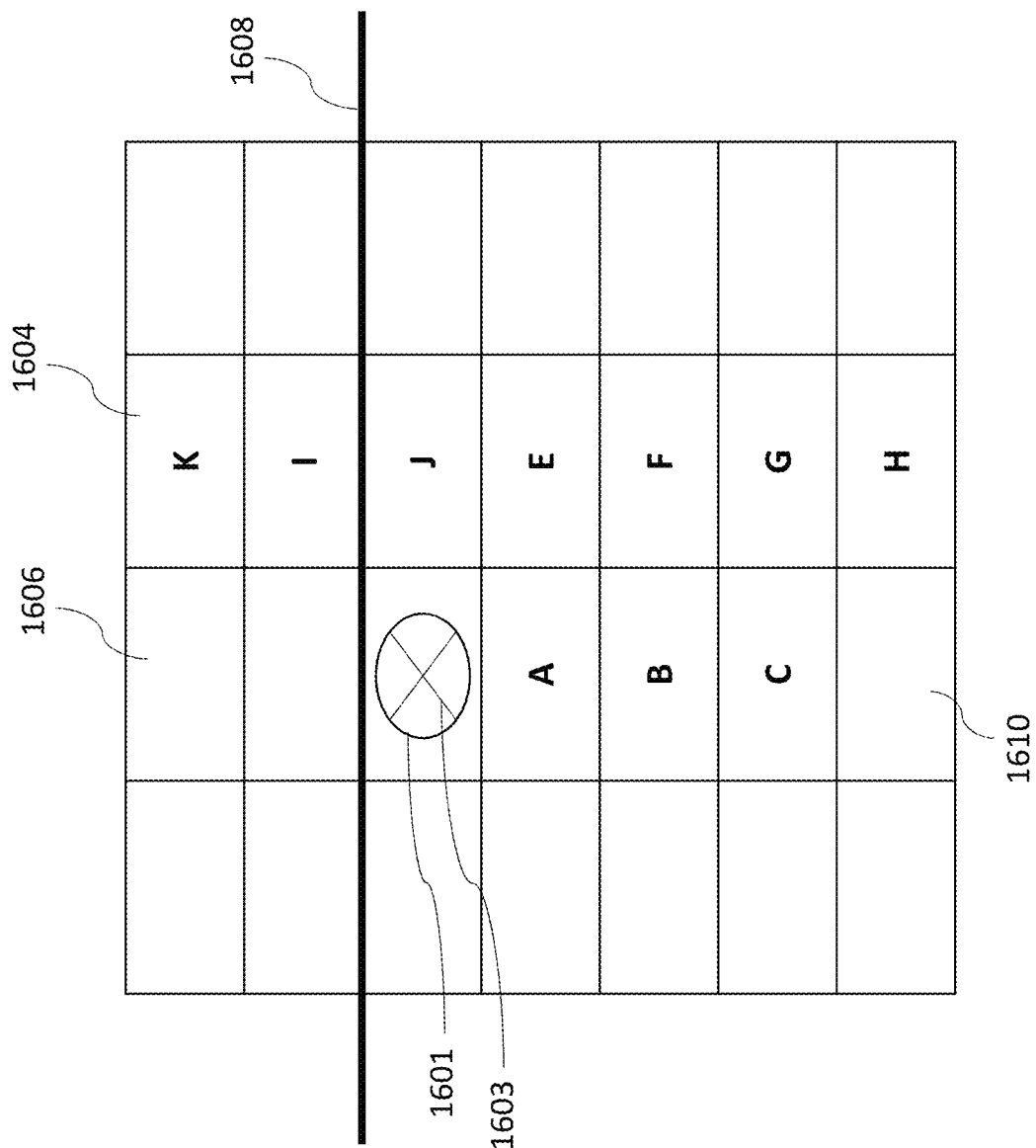

Reference is made to FIGS. 16a and 16b which schematically show an arrangement where the bubble object 1601 is provided in association with a capture object 1603. In the arrangement shown in FIG. 16a, two game objects 1602a and 1602b are to be removed as the user has selected one of these objects and the objects share a common characteristic. As can be seen from FIG. 16b, when the two game objects 1602a and 1602b are removed, the combined bubble and capture object will move upwardly. The game objects A, B and C below the combined capture and bubble object will move upwardly one position, in the direction of arrow 1606. In some embodiments, there is no replenishment from the bottom of the game board and accordingly the position associated with position 1610 will be empty. However, in other embodiments there may be replenishment of the game board alternatively or additionally from the bottom of the game board.

In the next column, which has no bubble, game objects J and I which were previously above the removed game object 1602b will move down one space and new game object referenced K will be provided at the top of the game board.

Figure 17A:
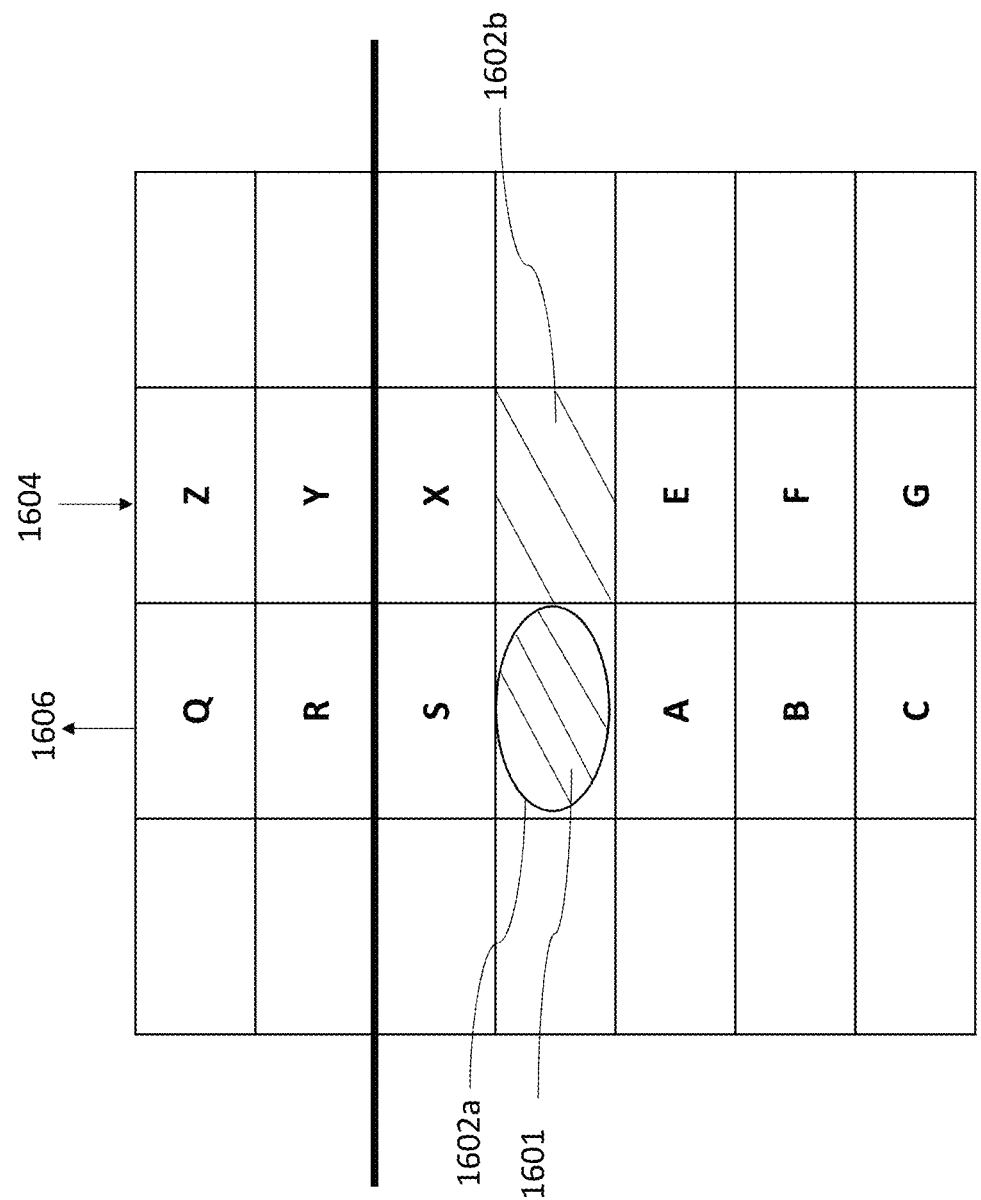
Figure 17B:
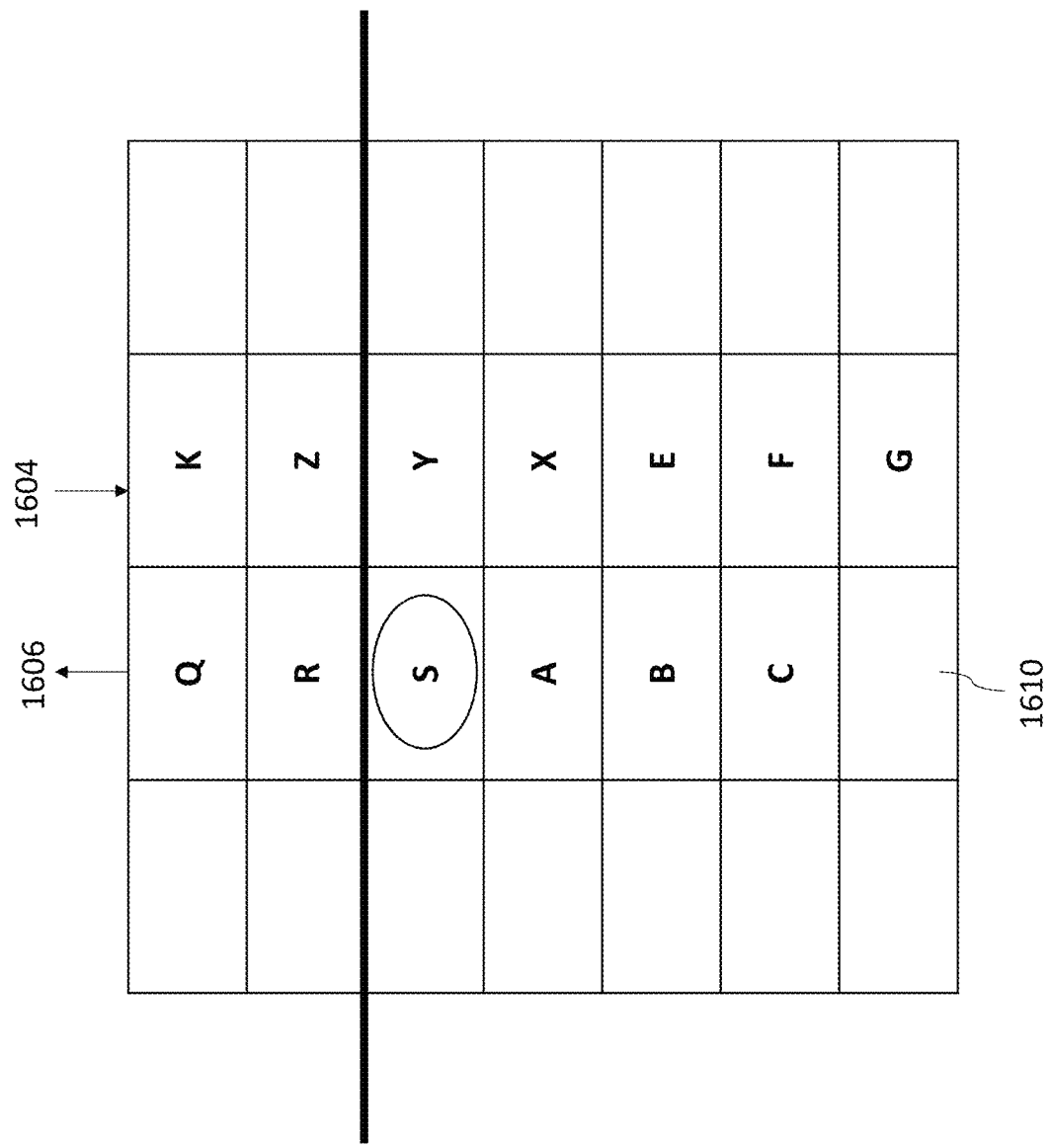

Reference is made to FIGS. 17a and 17b. In this example, the bubble object is associated with a game object 1602a which is to be removed along with adjacent game object 1602b. Game objects 1602a and 1602b share common characteristics as previously described. When the game objects are removed, the bubble object 1601 will move upwardly and become associated with the next game object, referenced S. The game object referenced S is above the removed game object. Thus, game objects A, B and C which were below the removed game object will also be moved upwardly in the column of the game board referenced 1610, as previously described. In contrast, in the column associated with the second removed game object 1602b, the game objects will move downwardly. Thus, game objects X, Y and Z are moved down by one space in order to fill up the void left by the removed game object 1602b and new game object K is inserted into the game board from above.

Figure 21:
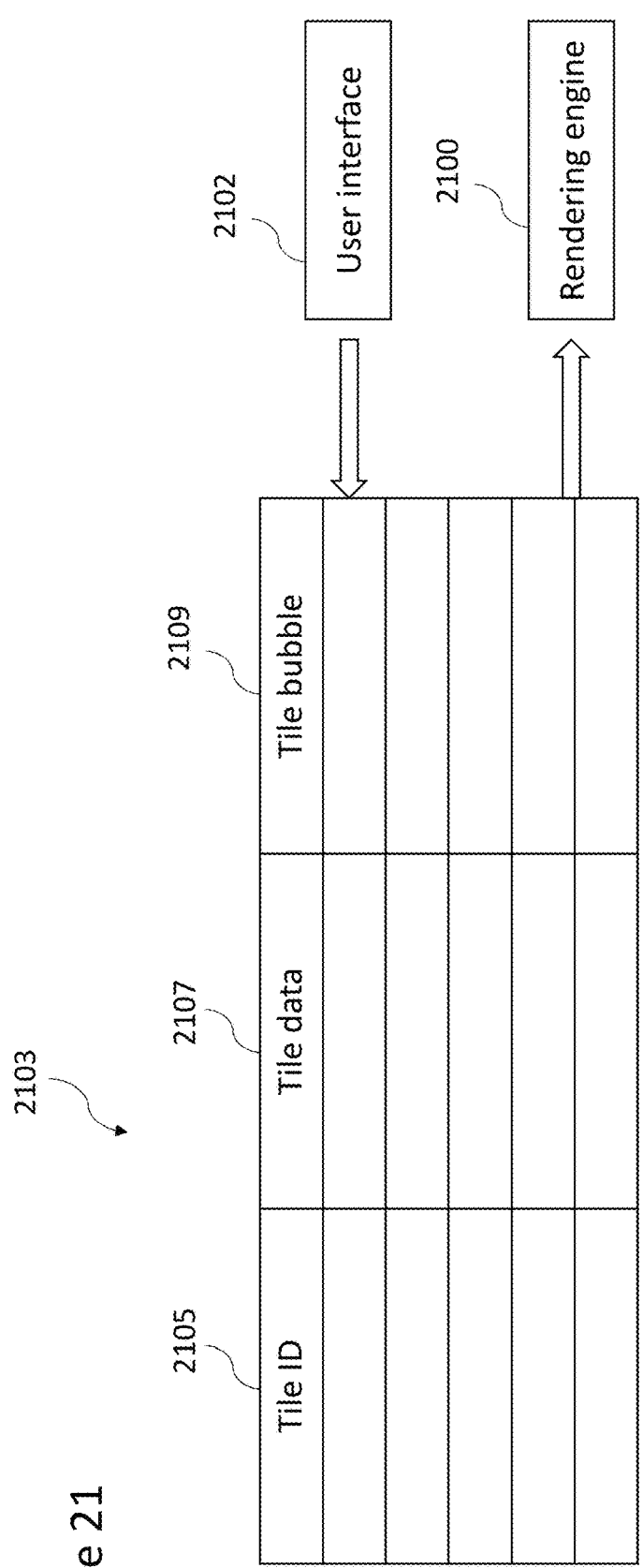
FIG. 21 schematically shows a data structure for managing tile data, showing the interrelation between the data structure and a rendering engine of a graphics controller.

FIG. 21 illustrates a data structure for managing the tile background appearance, and schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each tile has a tile ID 1605. The tile ID 1605 can define the position on the user interface where the tile is to be positioned. This allows the rendering engine 1600 to generate that tile at an appropriate position on the user interface display 1602. Each tile ID 1605 is associated with tile data 1607 which defines what game element it has associated with it, tile background data 1609 which defines if the tile is covered or uncovered and underlying entity data 1610 which defines if an entity of an underlying object is associated with that tile.

After a move has been made or there has been some change to the game board, the game engine will update this data such that updated tile image will be rendered by the rendering engine and displayed.

Figure 18:
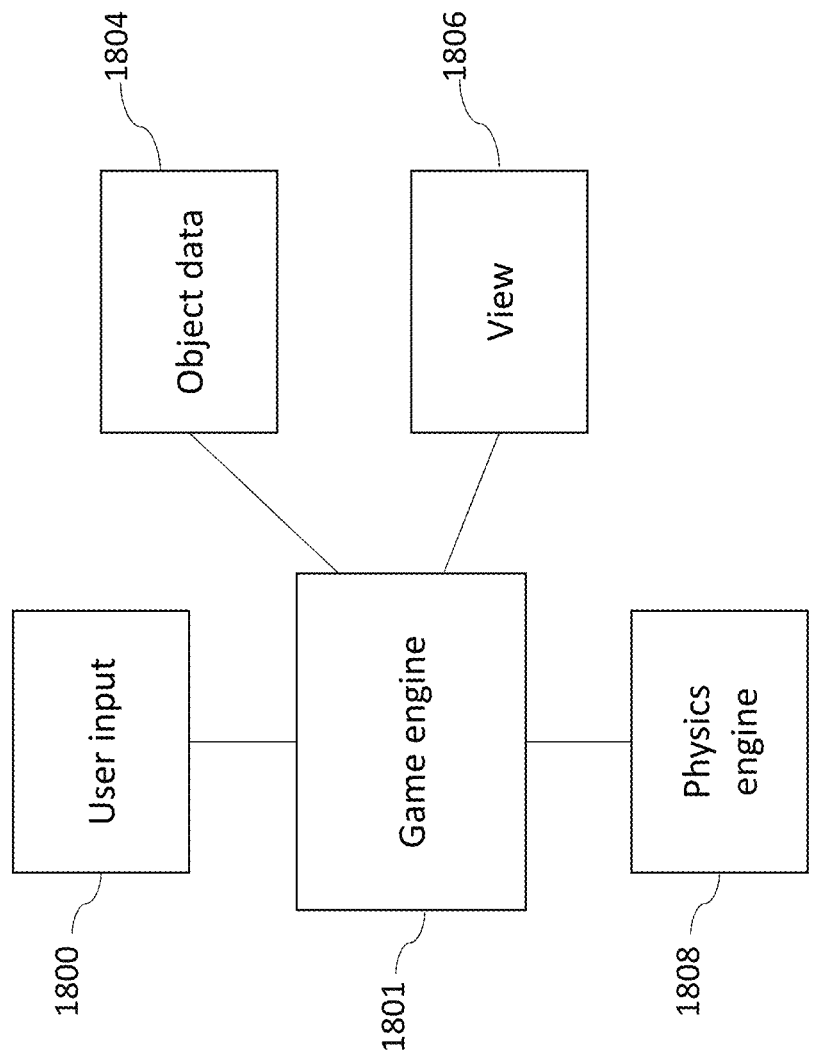
FIG. 18 is a schematic diagram showing the modules and functions associated with carrying out the operating of embodiments.

Reference is made to FIG. 18 which schematically shows the functional blocks of an embodiment, which may enable game play such as discussed previously. A user input block 1800 is shown. This captures the user input and feeds the input to a game engine 1802. In the context of the game of some embodiments, this user input may be which game objects which are selected by a user. This user input can be via any suitable user interface, such as discussed earlier.

The game engine 1802 will process the information provided by the user input. The game engine 1802 (for example a game model) will determine if a valid selection has been made.

Each game element has object data associated therewith. The object data 1804 may be stored in any suitable memory location. In some embodiments, the object data may be provided by the data structure described later. In some embodiments, the object data may be considered to be part of the game engine and in other embodiments may be considered to be outside the game engine. The object data may provide information as to the properties of a game element. These properties can include attribute information such as colour and/or whether or not a game element has a particular function such as a so-called booster function. The object data may include the position data, that is, information representing the position of the game element in the displayed image.

In some embodiments, the game engine will check if the game element satisfies the rule or rules for a valid set selection. The rule or rules may define whether or not a set exist been satisfied. The conditions will be dependent on the game.

Thus, the game engine will be in control of the rules for determining if a valid set is selected. The game engine will have access to data for each tile including its position and the at least one characteristic associated with the tile, and will be able to determine if a valid set condition has been met. If a valid set condition is met, the tiles in the set may be removed.

It should be appreciated that in other embodiments, the game may use any type of mechanic such as switching, sliding or linking. The game elements may be any suitable game element and in some embodiments may be letters. In that scenario a match will occur when the letters match a word.

A physics engine 808 is provided which is configured to control the movement of moving game elements on the display. The physics engine 808 may be part of the game engine 802. A view function 806 uses of the object data to provide the displayed image with which the user is able to view and/or interact.

FIG. 21 illustrates a data structure for managing the tile appearance, and schematically illustrates the interrelation between the data structure 2103 and a rendering engine 2100 of the graphics controller. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 2103 is responsible for controlling the game board displayed. Each tile has a tile ID 2105. The tile ID 2105 can define the position on the user interface where the tile is to be positioned. This allows the rendering engine 2100 to generate that tile at an appropriate position on the user interface display 2102. Each tile ID 2105 is associated with tile data 2107 which defines what game element it has associated with it, bubble data 2109 which defines if a bubble is associated with that tile.

After a move has been made or there has been some change to the game board, the game engine will update this data such that updated tile image will be rendered by the rendering engine and displayed.

Figure 22:
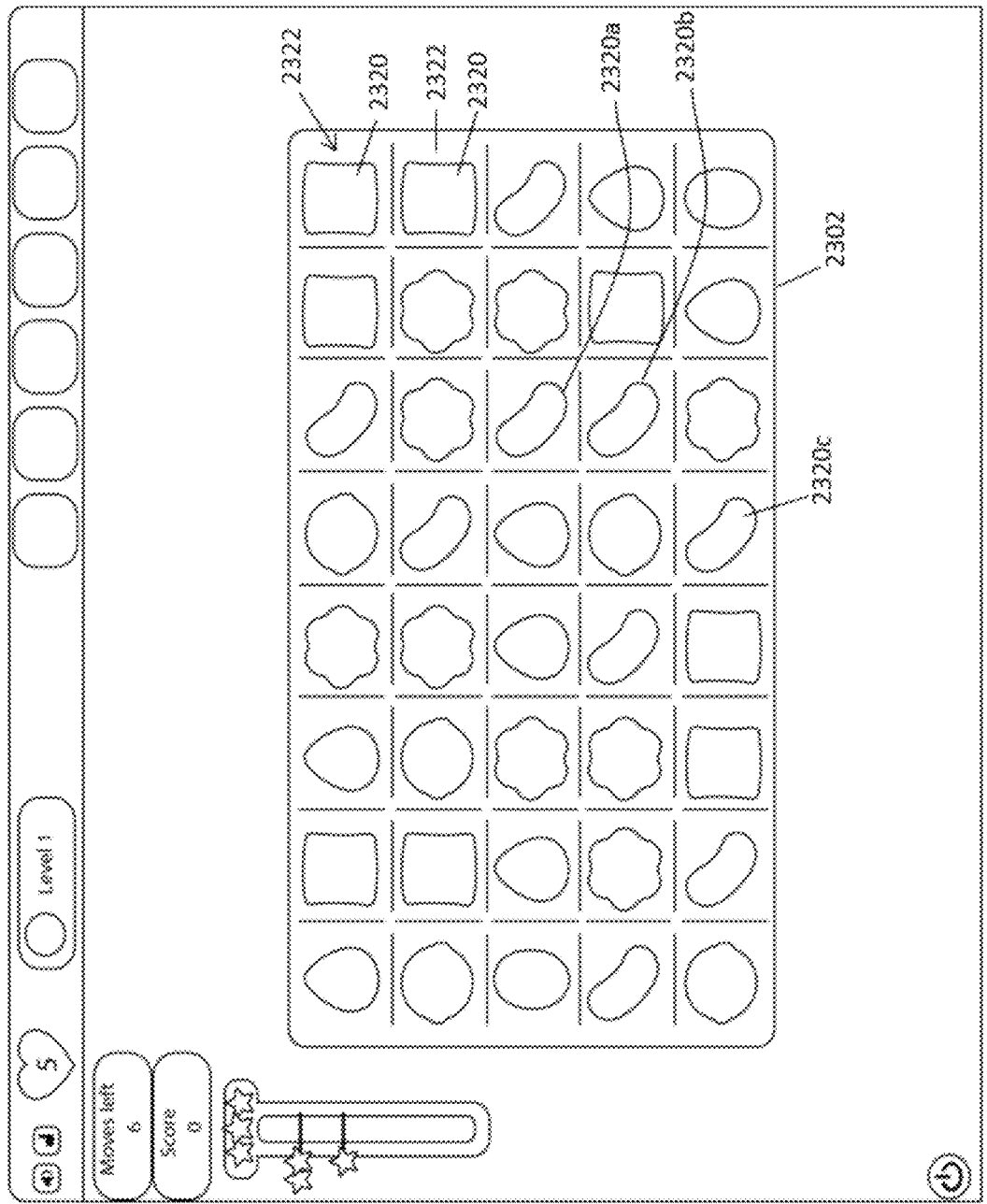
FIG. 22 is a schematic diagram of a game board of an alternate match three game.

FIG. 22 shows a display of a known version of a match 3 switcher game called Candy Crush Saga™. Some embodiments may alternatively or additionally use this type of game mechanic. FIG. 22 illustrates a game board 2302 with a plurality of game elements 2320. The game elements are each of six different shapes and colours. Each game element is supported by a tile 2322. The tiles are not readily visible to a player of the game—the game elements are the main focus for a player. However, the tiles govern characteristics of the game elements which are visible to a player as will be described in more detail later.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 22 that game element 2320c is moved one place to the right to form a three-line match with game elements 2320a and 2320b.

Figure 23:
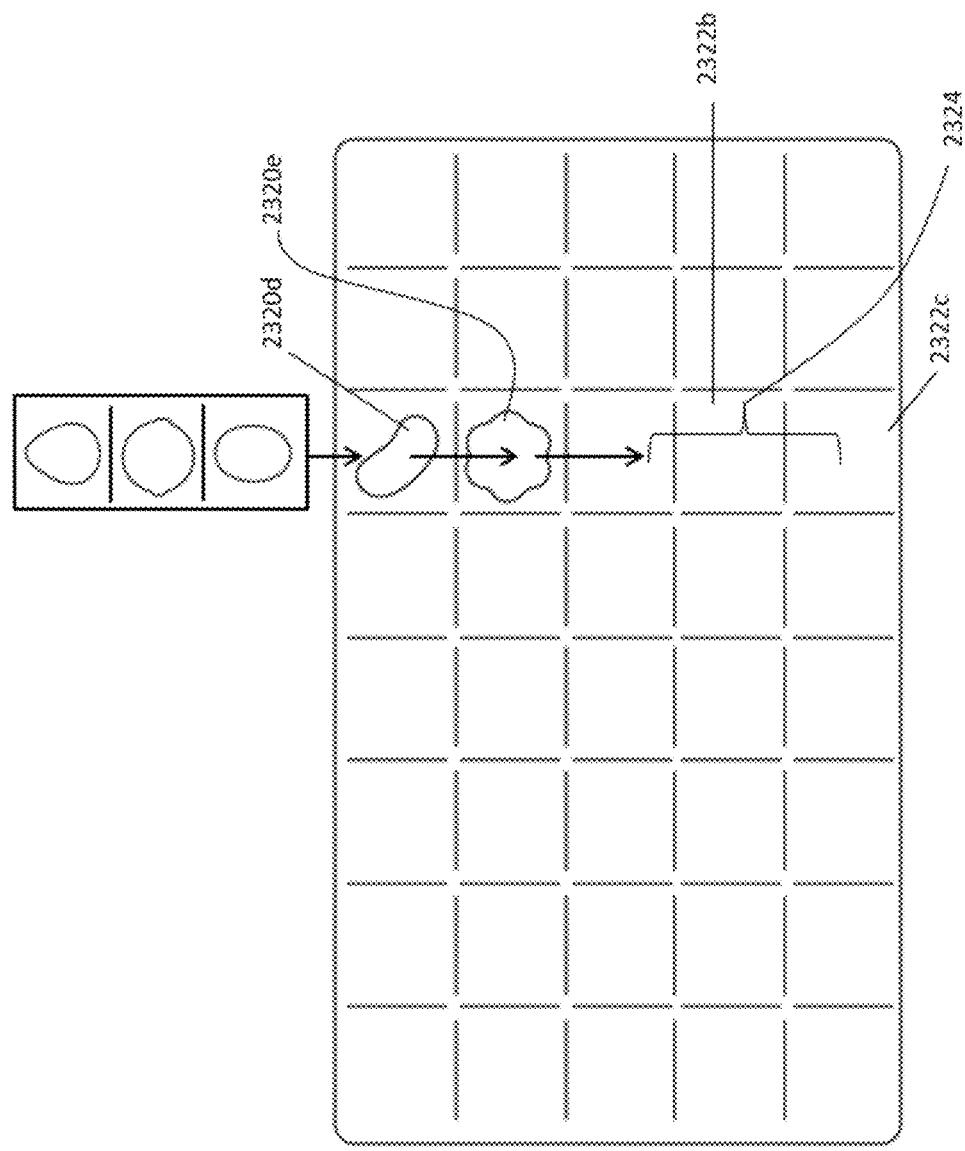
FIG. 23 is a schematic diagram illustrating how a game board is repopulated with replacement game elements.

Turning now to FIG. 23, this has the effect of game board elements 2320a, 2320b and 2320c "disappearing", creating a visual effect (animation) on the screen to indicate the disappearance, such as a minimal explosion effect denoted 2324 in FIG. 23. The two game elements which were directly above game elements 2320a will now fall downwards into the spaces created by the removal of game elements 2320a, 2320b and 2320c. Thus, game element 2320e will end up at the location of tile 2322c, and game element 2320d will end up at the location of tile 2322b. In addition, three new tiles with game elements are "created" and fall downwards into the game board to fill the remaining three spaces above tile 2322b. The game elements on the newly created tiles which fall downwards into the game board are generated at random. The user then has a new game board on which to play a subsequent move.

Figure 24:
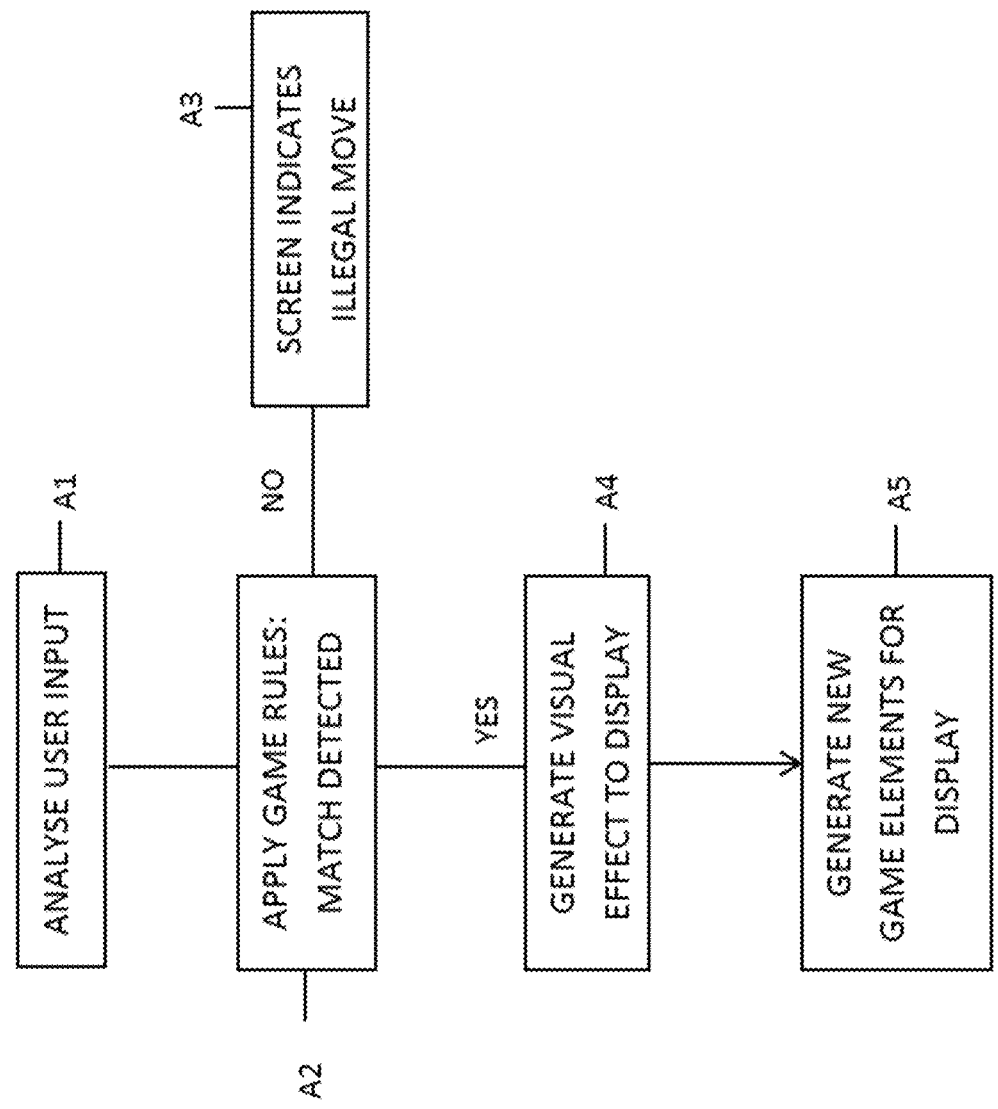
FIG. 24 is a flow chart of the method associated with FIG. 23.

FIG. 24 is a flow chart illustrating a process implemented by software in a processor for executing the basic game mechanic just discussed. At step A1 the input made by a player on the screen is analysed. At step A2 the game rules are applied to see whether or not at least a three-element match has been created. If it has not, at step A3, the screen indicates an illegal move to a user, and the player must try again. If a match has been detected, at step A4 an appropriate visual effect is generated for the display to denote the match and the disappearance of the game elements which have been matched. At step A5, new game elements are generated for the display, these game elements falling downwards to fill up the display from the top.

It will be appreciated that whilst the above has been described in relation to Candy Crush Saga™, embodiments are not limited to that particular game, and may support other games that use a similar or different game mechanics.

The terms user and player are used interchangeably throughout this document and no specific meaning is intended using one or the other unless the context suggests otherwise.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system comprising:
a game server which holds executable game code modules;
a store accessible by the game server holding user data; and
a plurality of user devices, each in communication with the server via a communication network, wherein each of the user devices is arranged to download and execute one or more of the computer game code modules which provides at the user device user selectable game objects on a display at the user device, and responds to user engagement with the game objects via a user interface to assess whether a game objective is attained, and to upload to the game server game data based on the user engagement with the game code module via the user interface, wherein the user device is further configured:
to render on the display a computer-generated navigable image comprising multiple location icons, each representing a location and each accessible by a user, each location icon, when accessed, causing said one or more executable game code modules to access and execute code to provide a gameboard on the display, the gameboard comprising said user selectable game objects responsive to user engagement; and
to receive event data from the game server and to show an indicator of an event based on the event data at the navigable image, the event being associated with one of the location icons, wherein the event data defines one or more game mode objects accessible by a user at the location icon, wherein
each game mode object provides, a game mode in which the gameboard is playable, the game mode providing an interaction with other users at the user devices;
the gameboard being playable such that a plurality of adjacent matching game objects are removed responsive to user engagement.

2. A computer system according to claim 1 wherein the computer game module comprises image generation code which when executed by the user device renders the navigable image on the display.

3. A computer system according to claim 1, wherein the event data defines a group of users to engage in a group game mode and wherein the gameboard is an initial game board of said user selectable objects generated on the display of each user device of a group of user devices, wherein the game server is configured to receive game data generated by other users at the other user devices who also receive the initial game board.

4. A computer system according to claim 3, wherein the group game mode is configured to generate on the display:
(i) ongoing game changes in the game board resulting from activity of the user in engaging with game objects of the game board; and
(ii) a progress indicator which indicates cumulative progress of the user and other users, using the game data generated by the user and remote user input game data.

5. A computer system according to, claim 1, wherein each user device comprises a local store which holds user data relating to contacts of the user.

6. A computer system according to claim 5, wherein the user data held in the store comprises play status data relating to contacts' last played location and/or last time of engagement with the game.

7. A computer system according to claim 5, wherein the local store holds user data defining the last location of the playing user at the user device where the user was engaged when he logged out of the game.

8. A computer system according to claim 5, wherein the user device comprises an event data generator operable to access the local store to generate event data to define a game mode object for display on that user device, wherein the event data defines a social game mode in which, in response to user engagement of the user with the game object, an electronic assistance message is generated which identifies a user at another of the user devices to receive help when a social game objective is attained.

9. A computer system according to claim 8, wherein an identifier of the user for whom the electronic assistance message is to provide assistance is comprised in event data and displayed at the location icon.

10. A computer system according to claim 1, wherein the event data defines a game mode object accessible for a predetermined time only.

11. A computer system according to claim 5 wherein each user device is configured to access user data in the local store from the server to enable offline operation when the user device is not in communication with the server.

12. A computer implemented method of controlling a display to user interface of a user device, the method comprising at the user device:
executing image computer code to render a computer-generated navigable image on the display, the navigable image comprising a plurality of location icons, each associated with at least one game mode object of multiple game mode objects of different types, each location icon, when accessed, causing said one or more executable game code modules to access and execute code to provide a gameboard on the display, the gameboard comprising said user selectable game objects responsive to user engagement; and
receiving from a game server event data which defines one or more game mode objects and responsive to receiving the event data showing on the display an indicator of the game mode object corresponding to each game mode in association with the location at which the game mode object is available, wherein each game mode object defined by the event data, provides a game mode in which the gameboard is playable to provide an interaction between the user of the user device and other users of other users devices which are interacting with the game server;
the gameboard being playable such that a plurality of adjacent matching user selectable game objects are removed responsive to user engagement.

13. A method according to claim 12, wherein the game mode defined by the event data is available at one or more locations for a pre-set time period.

14. A computer implemented method of controlling a display at a user interface of a user device, having a game code module available to execute a game and having a network interface for connection to a game server via a communication network, the method comprising when executing the game:
executing image generation code to render a computer-generated navigable image on the display, the navigable image comprising a plurality of location icons;
accessing contact data defining play status of users at other user devices connectable to the game server and selecting from the contact data one of the users to be helped;
presenting at one of the locations icons a selectable game mode object with an identifier of the selected user;

responsive to user selection of the game mode object, executing computer code to generate a game mode for user engagement at the user interface by a first user, the game mode providing user selectable game objects on a game board responding to user engagement with the game objects to generate a successful task signal when a game objective is attained;

and responsive to the successful task signal creating an electronic assistance message for transmission from the user device to the server, the message identifying the selected user.

15. A method according to claim 14, comprising the step of receiving an acknowledgement message from the selected user responsive to receipt of help provided in response to the electronic assistance message.

16. A method according to claim 15, comprising generating an electronic assistance message for each of multiple selected users to be helped and rendering on the display an indicator of the number of acknowledgements received at the user device from the users who received help.

17. A method according to claim 14, comprising the step of monitoring time lapsed since a last user access to a game in which the game mode is playable, and generating a game mode object with an entity identifier in dependence on the time lapsed.

18. A method according to claim 14, wherein the contact data comprises aggregated data from a plurality of user devices connectable to the server, the aggregated data defining the play status of each of the users.

19. A method according to claim 14, wherein an actuatable icon is presented in the game mode objection when the request task signal is generated, actuation of which causes the electronic assistance message to be created.

20. A method according to claim 14, comprising transmitting the electronic assistance message to the server.

21. A computer program product comprising computer code on a computer readable media which provides a game mode module which, when executed, performs the method of claim 14.

* * * * *